US009777152B2

(12) United States Patent
Hitomi et al.

(10) Patent No.: US 9,777,152 B2
(45) Date of Patent: Oct. 3, 2017

(54) POLYCARBONATE RESIN COMPOSITION, METHOD FOR PRODUCING SAME AND MOLDED ARTICLE OF THIS RESIN COMPOSITION

(71) Applicants: Tatsuya Hitomi, Kitakyushu (JP); Ryouhei Nishihara, Kitakyushu (JP); Masanori Yamamoto, Kitakyushu (JP); Michio Nakata, Kitakyushu (JP); Tetsurou Nobuyasu, Kitakyushu (JP); Ryuuji Uchimura, Kitakyushu (JP); Kazuyuki Takahashi, Kitakyushu (JP); Kenji Tsuruhara, Kitakyushu (JP); Tomonari Yokoyama, Hiratsuka (JP)

(72) Inventors: Tatsuya Hitomi, Kitakyushu (JP); Ryouhei Nishihara, Kitakyushu (JP); Masanori Yamamoto, Kitakyushu (JP); Michio Nakata, Kitakyushu (JP); Tetsurou Nobuyasu, Kitakyushu (JP); Ryuuji Uchimura, Kitakyushu (JP); Kazuyuki Takahashi, Kitakyushu (JP); Kenji Tsuruhara, Kitakyushu (JP); Tomonari Yokoyama, Hiratsuka (JP)

(73) Assignees: Mitsubishi Chemical Corporation, Tokyo (JP); Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 13/632,957

(22) Filed: Oct. 1, 2012

(65) Prior Publication Data

US 2013/0030113 A1 Jan. 31, 2013

Related U.S. Application Data

(63) Continuation of application No. PCT/JP2011/058326, filed on Mar. 31, 2011.

(30) Foreign Application Priority Data

| Mar. 31, 2010 | (JP) | 2010-083181 |
| Nov. 25, 2010 | (JP) | 2010-262053 |
| Nov. 25, 2010 | (JP) | 2010-262054 |
| Nov. 25, 2010 | (JP) | 2010-262057 |
| Jan. 31, 2011 | (JP) | 2011-018523 |
| Jan. 31, 2011 | (JP) | 2011-018524 |
| Jan. 31, 2011 | (JP) | 2011-018527 |
| Mar. 4, 2011 | (JP) | 2011-047877 |
| Mar. 30, 2011 | (JP) | 2011-076450 |

(51) Int. Cl.
*C08L 69/00* (2006.01)
*B29K 69/00* (2006.01)

(52) U.S. Cl.
CPC .......... *C08L 69/00* (2013.01); *B29K 2069/00* (2013.01); *C08L 2205/02* (2013.01)

(58) Field of Classification Search
CPC ........................................................ C08L 69/00
USPC ................................................................ 524/537
See application file for complete search history.

(56) References Cited

U.S. PATENT DOCUMENTS

| 3,890,266 A | 6/1975 | Serini et al. | |
| 2003/0060575 A1* | 3/2003 | Caruso et al. | 525/462 |
| 2008/0015289 A1 | 1/2008 | Siripurapu | |
| 2009/0176946 A1* | 7/2009 | Kusters et al. | 525/462 |

FOREIGN PATENT DOCUMENTS

| CN | 101511937 | 8/2009 |
| CN | 101747610 | 6/2010 |
| EP | 1 484 351 A1 | 12/2004 |
| EP | 2 199 076 A1 | 6/2010 |
| JP | 49-73455 | 7/1974 |
| JP | 62-10160 A | 1/1987 |
| JP | 63-43949 A | 2/1988 |
| JP | 64-69625 A | 3/1989 |
| JP | 4-279659 A | 10/1992 |
| JP | 8-183852 A | 7/1996 |

(Continued)

OTHER PUBLICATIONS

U.S. Appl. No. 13/632,289, filed Oct. 1, 2012, Hitomi, et al.

(Continued)

*Primary Examiner* — Michael Pepitone
(74) *Attorney, Agent, or Firm* — Oblon, McClelland, Maier & Neustadt, L.L.P.

(57) ABSTRACT

To provide a polycarbonate resin composition excellent in surface hardness and impact strength.

A polycarbonate resin composition comprising at least a polycarbonate resin (a) and a polycarbonate resin (b) having structural units different from the polycarbonate resin (a), which satisfies the requirements:

(i) the pencil hardness of the polycarbonate resin (a) as specified by ISO15184 is higher than the pencil hardness of the polycarbonate resin (b) as specified by ISO15184;

(ii) the weight ratio of the polycarbonate resin (a) to the polycarbonate resin (b) in the polycarbonate resin is from 1:99 to 45:55;

(iii) the pencil hardness of the polycarbonate resin composition as specified by ISO15184 is higher by at least two ranks than the pencil hardness of the polycarbonate resin (b) as specified by ISO15184; and (iv) the Charpy impact strength of the polycarbonate resin composition is higher than the Charpy impact strength of the polycarbonate resin (a).

33 Claims, No Drawings

(56) References Cited

FOREIGN PATENT DOCUMENTS

| | | |
|---|---|---|
| JP | 9-176473 A | 7/1997 |
| JP | 2003-128906 | 5/2003 |
| JP | 2003-531943 A | 10/2003 |
| JP | 2003-535948 | 12/2003 |
| JP | 2005-272708 A | 10/2005 |
| JP | 2010-59316 A | 3/2010 |
| JP | 2010-188719 A | 9/2010 |
| WO | WO 01/83615 A2 | 11/2001 |
| WO | WO 01/94469 A1 | 12/2001 |
| WO | WO 2008/002734 A2 | 1/2008 |
| WO | WO 2008/002734 A3 | 1/2008 |
| WO | 2008/018467 | 2/2008 |
| WO | WO 2009/083933 A1 | 7/2009 |

OTHER PUBLICATIONS

International Search Report issued in PCT/JP2011/058326 dated Jun. 28, 2011 filed Mar. 31, 2011.
Extended European Search Report issued Sep. 5, 2013 in Patent Application No. 11765796.5.
Korean Notice of Grounds for Rejection issued Jan. 24, 2014 in connection with corresponding Korean Patent Application No. 2012-7025228, filed Mar. 31, 2011.
U.S. Appl. No. 14/170,995, filed Feb. 3, 2014, Hitomi, et al.
Japanese Office Action issued Dec. 5, 2014 in connection with corresponding Japanese Patent Application No. 2011-076450, filed Mar. 30, 2011.
Chinese Office Action issued Jan. 16, 2015 in connection with corresponding Chinese Patent Application No. 201180016601.6, filed Mar. 31, 2011.
Taiwanese Office Action issued Jan. 15, 2015 in connection with corresponding Taiwanese Patent Application No. 100111486, filed Mar. 31, 2011.
Chinese Office Action (with English translation) issued Nov. 20, 2013 in connection with corresponding Chinese Patent Application N201180016601.6.
Combined Chinese Office Action and Search Report issued Jul. 11, 2014 in Patent Application No. 201180016601.6 (with partial English language translation).
Office Action issued Aug. 18, 2015 in Japanese Patent Application No, 2011-076450 (with English language translation).
Third Party Submission issued Feb. 25, 2015 in Japanese Patent Application No. 2011-76450 (with English language translation).
Office Action issued Aug. 18, 2015 in Japanese Patent Application No. 2011-094723 (with English language translation).
Third Party Submission issued Mar. 30, 2015 in Japanese Patent Application No. 2011-94723 (with English language translation).
Third Party Submission issued May 25, 2015 in Japanese Patent Application No. 2011-256723 (with English language translation).
Office Action issued Aug. 4, 2015 in Japanese Patent Application No. 2011-256724 (with English language translation).
Third Party Submission issued Apr. 3, 2015 in Japanese Patent Application No. 2011-256724 (with English language translation).
Office Action issued Aug. 18, 2015 in Japanese Patent Application No. 2011-256725 (with English language translation).
Third Party Submission issued May 25, 2015 in Japanese Patent Application No. 2011-256725 (with English language translation).
Office Action issued Aug. 18, 2015 in Japanese Patent Application No. 2011-256726 (with English language translation).
Third Party Submission issued Apr. 3, 2015 in Japanese Patent Application No. 2011-256726 (with English language translation).
Office Action issued Aug. 18, 2015 in Japanese Patent Application No. 2011-256727 (with English language translation).
Third Party Submission issued Apr. 3, 2015 in Japanese Patent Application No. 2011-256727 (with English language translation).

* cited by examiner

POLYCARBONATE RESIN COMPOSITION, METHOD FOR PRODUCING SAME AND MOLDED ARTICLE OF THIS RESIN COMPOSITION

TECHNICAL FIELD

The present invention relates to a polycarbonate resin composition and a method for producing it. More particularly, it relates to a polycarbonate resin composition comprising at least two types of polycarbonate resins differing in structural units, and a method for producing it.

BACKGROUND ART

A polycarbonate resin is excellent in the mechanical strength, the electrical properties, the transparency and the like, and is widely used as an engineering plastic in various fields such as electric and electronic equipment fields and automobile fields. In recent years, in such application fields, reduction in thickness, downsizing and weight saving of molded article are in progress, and further improvement in the performance of materials to be molded is required. However, a conventional polycarbonate resin made of bisphenol A as a material has not necessarily been sufficiently excellent in the surface hardness. Particularly in outdoor use applications, as the hardness is insufficient, an additional treatment such as hard coating treatment has been applied to the surface in many cases.

Accordingly, development of a polycarbonate resin having a high surface hardness has been desired, and several proposals have been made.

For example, Patent Documents 1 and 2 propose a method for producing a polycarbonate or a copolycarbonate excellent in the surface hardness by using a bisphenol different from bisphenol A as a monomer.

Patent Document 1 discloses to carry out hard coating by a hardened coating film comprising a compound having at least two ethylenic unsaturated bonds and urethane bonds in the same molecule.

Patent Document 2 proposes a copolycarbonate resin comprising at least two types of aromatic dihydroxy compounds, as a method of increasing the hardness.

Further, Patent Document 3 proposes a method of bonding different types of polymers on a molded specimen such as hard coating treatment, to form a multilayered structure.

Further, Patent Document 4 proposes to improve the surface hardness of a blended material of a polycarbonate resin derived from dimethyl bisphenol cyclohexane and a bisphenol A type polycarbonate resin.

PRIOR ART DOCUMENTS

Patent Documents

Patent Document 1: JP-A-2005-272708
Patent Document 2: JP-A-8-183852
Patent Document 3: JP-A-2010-188719
Patent Document 4: WO2009/083933

DISCLOSURE OF INVENTION

Technical Problem

However, with materials obtained by conventional methods, a polycarbonate resin composition which has high strength even though it is thin, which has excellent heat resistance and moldability, which has a high surface hardness and which is excellent in the color, could not be obtained.

Under these circumstances, the object of the present invention is to provide a polycarbonate resin composition having a high hardness and having excellent color, impact resistance and flame retardancy, and a method for producing it.

Further, the object of the present invention is to provide a molded article of polycarbonate resin having excellent surface hardness and excellent impact resistance, without surface hard coating or without having a laminated structure comprising different polycarbonate resins.

Solution to Problem

The present inventors have conducted extensive studies to achieve the above objects and as a result, they have found that a polycarbonate resin composition which attains the above objects can be achieved by a polycarbonate resin composition containing specific two types of polycarbonate resins, and accomplished the present invention. Specifically, it was found that an excellent polycarbonate resin composition having an excellent surface hardness, having a favorable color and being comparable in the impact strength and moldability to conventional polycarbonate resins, can be obtained by a polycarbonate resin composition comprising a polycarbonate resin (a) having a relatively high pencil hardness and a polycarbonate resin (b), in a specific weight ratio of the polycarbonate resin (a) to the polycarbonate resin (b).

More specifically, it was found that by mixing the polycarbonate resin (a) and the polycarbonate resin (b) in a specific weight ratio, physical properties, particularly the surface hardness, of a polycarbonate resin composition are specifically improved, and a favorable color is maintained. For example, usually, a polycarbonate blended product and a copolymerized polycarbonate resin having the same structural units and amount, have the same properties in many cases. However, the surface hardness of a polycarbonate resin composition of the present invention comprising the polycarbonate resin (a) and the polycarbonate resin (b) in a specific weight ratio is remarkably higher than the surface hardness of a copolymerized polycarbonate resin having the same structural units in the same weight ratio as the polycarbonate resin composition. In addition, if the copolymerized polycarbonate resin is designed to have the surface hardness at the same level as the polycarbonate resin composition of the present invention, the color is definitely deteriorated.

The present invention provides the following <1> to <30>.

That is, the present invention provides, first, the following polycarbonate resin composition.

<1> A polycarbonate resin composition comprising at least a polycarbonate resin (a) and a polycarbonate resin (b) having structural units different from the polycarbonate resin (a), which satisfies the following requirements:

(i) the pencil hardness of the polycarbonate resin (a) as specified by ISO 15184 is higher than the pencil hardness of the polycarbonate resin (b) as specified by ISO 15184;

(ii) the weight ratio of the polycarbonate resin (a) to the polycarbonate resin (b) is from 1:99 to 45:55;

(iii) the pencil hardness of the polycarbonate resin composition as specified by ISO 15184 is higher by at least two ranks than the pencil hardness of the polycarbonate resin (b) as specified by ISO 15184; and (iv) the Charpy impact strength of the polycarbonate resin composition is higher than the Charpy impact strength of the polycarbonate resin (a).

<2> A polycarbonate resin composition comprising at least a polycarbonate resin (a) and a polycarbonate resin (b) having structural units different from the polycarbonate resin (a), which satisfies the following requirements:

(i) the pencil hardness of the polycarbonate resin (a) as specified by ISO 15184 is higher than the pencil hardness of the polycarbonate resin (b) as specified by ISO 15184;

(ii) the weight ratio of the polycarbonate resin (a) to the polycarbonate resin (b) is from 1:99 to 45:55;

(iii) the ratio of the viscosity average molecular weight Mv(a) of the polycarbonate resin (a) to the viscosity average molecular weight Mv(b) of the polycarbonate resin (b), Mv(a)/Mv(b), is at least 0.02 and at most 1.5.

<3> The polycarbonate resin according to the above <2>, wherein the above Mv(a) is at most 20,000.

<4> A polycarbonate resin composition comprising at least a polycarbonate resin (a) and a polycarbonate resin (b) having structural units different from the polycarbonate resin (a), which satisfies the following requirements:

(i) the pencil hardness of the polycarbonate resin (a) as specified by ISO 15184 is higher than the pencil hardness of the polycarbonate resin (b) as specified by ISO 15184;

(ii) the weight ratio of the polycarbonate resin (a) to the polycarbonate resin (b) is from 1:99 to 45:55;

(iii) the melt viscosity of the polycarbonate resin (b) at a temperature of 280° C. at a shear rate of 122 $sec^{-1}$ is higher than the melt viscosity of the polycarbonate resin (a) at a temperature of 280° C. at a shear rate of 122 $sec^{-1}$.

<5>. The polycarbonate resin composition according to any one of the above <1> to <4>, wherein the pencil hardness of the polycarbonate resin (a) as specified by ISO 15184 is at least F.

<6> The polycarbonate resin composition according to any one of the above <1> to <5>, wherein the pencil hardness of the polycarbonate resin composition as specified by ISO 15184 is at least HB.

<7> The polycarbonate resin composition according to any one of the above <1> to <6>, wherein the polycarbonate resin (a) is a polycarbonate resin having at least structural units derived from a compound represented by the following formula (1):

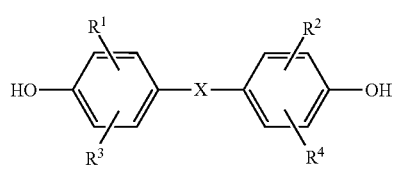

Formula (1)

wherein each of $R^1$ and $R^2$ which are independent of each other, is a substituted or non-substituted $C_{1-20}$ alkyl group or a substituted or non-substituted aryl group, each of $R^3$ and $R^4$ which are independent of each other, is a hydrogen atom, a substituted or non-substituted $C_{1-20}$ alkyl group or a substituted or non-substituted aryl group, and X is a single bond, a carbonyl group, a substituted or non-substituted alkylidene group, an oxidized or non-oxidized sulfur atom, or an oxygen atom.

<8> The polycarbonate resin composition according to the above <7>, wherein the polycarbonate resin (a) is a polycarbonate resin having at least structural units (a) derived from at least one compound selected from the group consisting of the following formulae (1a) to (1c):

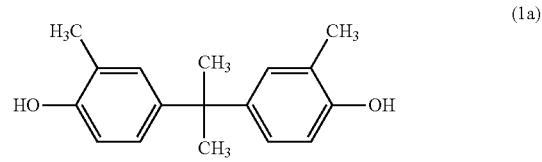

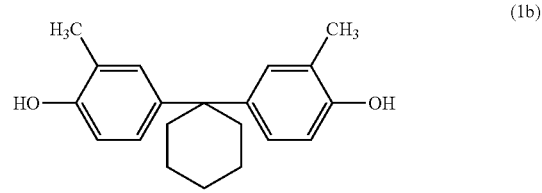

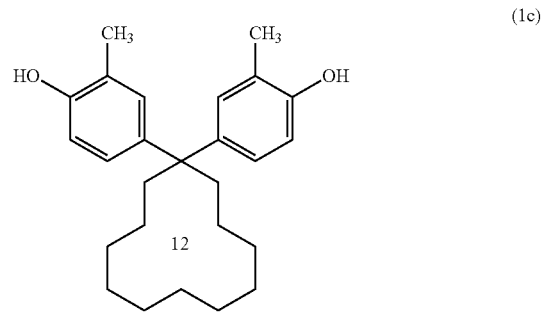

<9> The polycarbonate resin composition according to any one of the above <1> to <8>, wherein the polycarbonate resin (b) is a polycarbonate resin having mainly structural units (b) derived from a compound represented by the following formula (2):

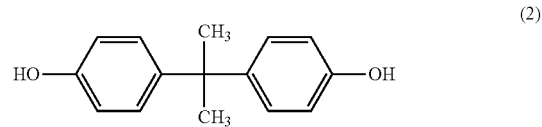

<10> The polycarbonate resin composition according to any one of the above <1> to <9>, which has a yellowness index (YI) of at most 4.0.

<11> The polycarbonate resin composition according to any one of the above <1> to <10>, which further contains a flame retardant.

<12> A method for producing the polycarbonate resin composition as defined in any one of the above <1> to <11>, which comprises melt-kneading the polycarbonate resin (a) and the polycarbonate resin (b).

<13> A method for producing the polycarbonate resin composition as defined in any one of the above <1> to <11>, which comprises dry-blending the polycarbonate resin (a) and the polycarbonate resin (b).

<14> An injection-molded article, which is obtained by injection-molding the polycarbonate resin composition as defined in any one of the above <1> to <11>.

<15> An extruded article, which is obtained by extruding the polycarbonate resin composition as defined in any one of the above <1> to <11>.

<16> The extruded article according to the above <15>, which is a sheet or a film.

<17> A molded article of polycarbonate resin having structural units (a) derived from a compound represented by the following formula (1) and structural units (b) different from the structural units (a), wherein the ratio of the content [S] of the structural units (a) on the surface of the molded article of polycarbonate resin to the content [T] in the entire molded article of polycarbonate resin ([S]/[T]) is higher than 1.00 and at most 2.00:

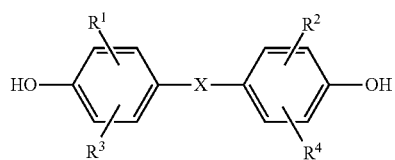

Formula (1)

wherein each of $R^1$ and $R^2$ which are independent of each other, is a substituted or non-substituted $C_{1-20}$ alkyl group or a substituted or non-substituted aryl group, each of $R^3$ and $R^4$ which are independent of each other, is a hydrogen atom, a substituted or non-substituted $C_{1-20}$ alkyl group or a substituted or non-substituted aryl group, and X is a single bond, a carbonyl group, a substituted or non-substituted alkylidene group, an oxidized or non-oxidized sulfur atom, or an oxygen atom.

<18> The molded article of polycarbonate resin according to the above <17>, which is an injection-molded article.

<19> The molded article of polycarbonate resin according to the above <17> or <18>, wherein the ratio of the content [S] of the structural units (a) on the surface of the molded article of polycarbonate resin to the content [T] in the entire molded article of polycarbonate resin ([S]/[T]) is at least 1.01 and at most 1.50.

<20> The molded article of polycarbonate resin according to any one of the above <17> to <19>, wherein the pencil hardness on the surface of the molded article of polycarbonate resin as specified by ISO 15184 is at least HB.

<21> The molded article of polycarbonate resin according to any one of the above <17> to <20>, wherein the structural units (a) are structural units derived from at least one compound selected from the group consisting of the following formulae (1a) to (1c):

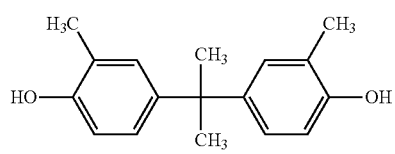

(1a)

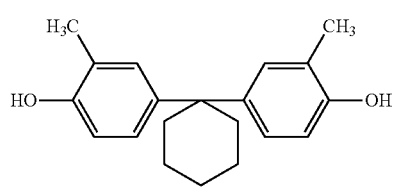

(1b)

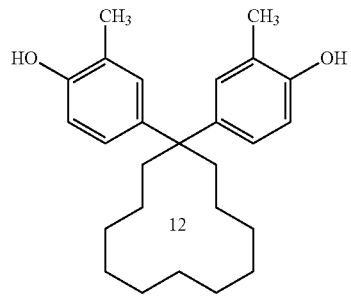

(1c)

<22> The molded article of polycarbonate resin according to any one of the above <17> to <21>, wherein the structural units (b) are mainly structural units derived from a compound of the following formula (2):

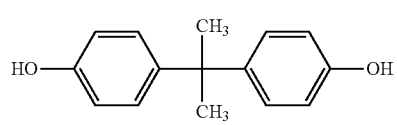

(2)

<23> The molded article of polycarbonate resin according to any one of the above <17> to <22>, which comprises at least a polycarbonate resin (a) having structural units (a) derived from a compound represented by the formula (1) and a polycarbonate resin (b) having structural units (b) different from the structural units (a) and having a structure different from the polycarbonate resin (a).

<24> The molded article of polycarbonate resin according to the above <23>, wherein the pencil hardness of the polycarbonate resin (a) as specified by ISO 15184 is higher than the pencil hardness of the polycarbonate resin (b) as specified by ISO 15184.

<25> The molded article of polycarbonate resin according to the above <23> or <24>, wherein the pencil hardness of the polycarbonate resin (a) as specified by ISO 15184 is at least F.

<26> The molded article of polycarbonate resin according to any one of the above <23> to <25>, wherein the viscosity average molecular weight of the polycarbonate resin (a) is higher than the viscosity average molecular weight of the polycarbonate resin (b).

<27> A method for producing the molded article of polycarbonate resin as defined in any one of the above <23> to <26>, comprising at least a polycarbonate resin (a) having structural units (a) derived from a compound represented by the following formula (1) and a polycarbonate resin (b) having structural units (b) different from the structural units (a), which comprises melt-kneading or dry-blending the polycarbonate resin (a) and the polycarbonate resin (b), followed by molding, wherein the viscosity average molecular weight of the polycarbonate resin (a) is higher than the viscosity average molecular weight of the polycarbonate resin (b):

Formula (1)

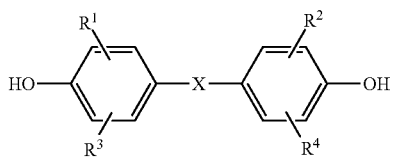

wherein each of $R^1$ and $R^2$ which are independent of each other, is a substituted or non-substituted $C_{1-20}$ alkyl group or a substituted or non-substituted aryl group, each of $R^3$ and $R^4$ which are independent of each other, is a hydrogen atom, a substituted or non-substituted $C_{1-20}$ alkyl group or a substituted or non-substituted aryl group, and X is a single bond, a carbonyl group, a substituted or non-substituted alkylidene group, an oxidized or non-oxidized sulfur atom, or an oxygen atom.

<28> The method for producing the molded article of polycarbonate resin according to the above <27>, wherein the structural units (a) are structural units derived from at least one compound selected from the group consisting of the following formulae (1a) to (1c):

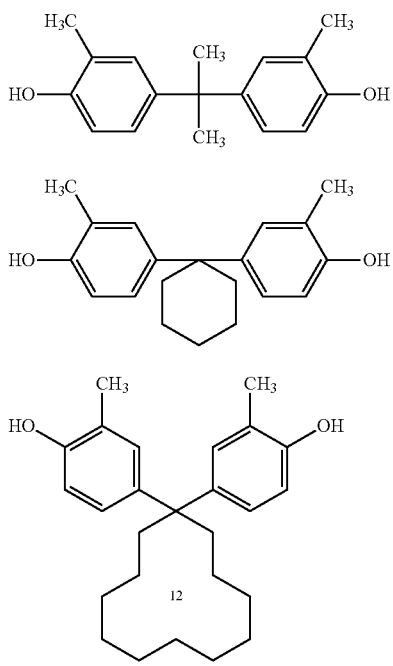

<29> The method for producing the molded article of polycarbonate resin according to the above <27> or <28>, wherein the structural units (b) are mainly structural units derived from a compound of the following formula (2):

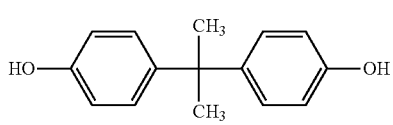

<30> The method for producing the molded article of polycarbonate resin according to any one of the above <27> to <29>, wherein the molding is injection molding.

Advantageous Effects of Invention

According to the present invention, it is possible to obtain a polycarbonate resin composition having a remarkably improved surface hardness and having a favorable color, and having the impact resistance and the moldability well balanced. That is, by a polycarbonate resin composition comprising a polycarbonate resin (b) and a polycarbonate resin (a) having a relatively high pencil hardness in a specific weight ratio, it is possible to increase the surface hardness, to maintain a favorable color and to make the impact resistance and the moldability be well balanced, without impairing the physical properties of the polycarbonate resin (b). For example, in a case where a bisphenol A type polycarbonate is used as the polycarbonate resin (b), the surface hardness which is a disadvantage of the bisphenol A type polycarbonate can be improved while minimizing a decrease in the impact resistance, the transparency, the color and the like which are characteristics of the bisphenol A type polycarbonate.

Further, according to the present invention, a polycarbonate resin molded article having an excellent surface hardness and having good flame retardancy can be provided.

DESCRIPTION OF EMBODIMENTS

The present invention relates to, first, a polycarbonate resin composition comprising at least a polycarbonate resin (a) and a polycarbonate resin (b) having structural units different from the polycarbonate resin (a), which satisfies the following requirements (i) to (iv).

In the present invention, "having different structural units" means [I] "having different types of structural units" in a case where each of the polycarbonate resin (a) and the polycarbonate resin (b) is a homopolymer, and means [II] (A) having different types of structural units or (B) having the same type of structural units and having a different compositional ratio of the structural units in a case where at least one of the polycarbonate resin (a) and the polycarbonate resin (b) is a copolymer.

That is, a specific example of the above [I] is a case where the polycarbonate resin (a) is a homopolymer comprising structural units (a) and the polycarbonate resin (b) is a homopolymer comprising structural units (b).

A specific example of [II] (A) is a case where the polycarbonate resin (a) is a copolymer comprising structural units (a) and structural units (c), and the polycarbonate resin (b) is a copolymer comprising structural units (b) and structural units (c).

A specific example of the above [II] (B) is a case where each of the polycarbonate resin (a) and the polycarbonate resin (b) comprises structural units (a) and structural units (b), however, the polycarbonate resin (a) and the polycarbonate resin (b) are different in the ratio of the structural units (a) to the structural units (b).

First, the requirement (i) is that the pencil hardness of the polycarbonate resin (a) constituting the polycarbonate resin composition of the present invention as specified by ISO 15184 is higher than the pencil hardness of the polycarbonate resin (b) as specified by ISO 15184. Here, the pencil hardness of the polycarbonate resin or the polycarbonate resin composition specified here is the pencil hardness measured in the form of an injection-molded article, as described in the evaluation method "(1) pencil hardness of molded article" in Examples in detail. Hereinafter, in this specification, "the pencil hardness" means this pencil hardness of an injection-molded article, unless otherwise specified.

If the pencil hardness of the polycarbonate resin (a) is equal to or lower than the pencil hardness of the polycarbonate resin (b), the pencil hardness of the polycarbonate resin composition may be low, and the surface of a molded article is likely to be scarred.

A favorable pencil hardness of the polycarbonate resin (a) is at least F by the pencil hardness as specified by ISO 15184. If the pencil hardness of the polycarbonate resin (a) is less than F, the pencil hardness of the polycarbonate resin composition may not sufficiently be improved in some cases.

Then, the requirement (ii) is that the weight ratio of the polycarbonate resin (a) to the polycarbonate resin (b) in the polycarbonate resin composition of the present invention is within a range of from 1:99 to 45:55. It is preferably from 3:97 to 45:55, more preferably from 5:95 to 40:60, further preferably from 10:90 to 30:70. If the proportion of the polycarbonate resin (a) is too high, the color of an obtainable polycarbonate resin composition tends to be impaired, and no sufficient impact resistance will be obtained, and if the proportion of the polycarbonate resin (a) is too low, the pencil hardness may be insufficient.

Further, the requirement (iii) is that the pencil hardness of the polycarbonate resin composition of the present invention as specified by ISO 15184 is higher by at least two ranks than the pencil hardness of the polycarbonate resin (b) as specified by ISO 15184, and it is preferably higher by at least three ranks.

The pencil hardness ranks are, from lower ranks, 2B, B, HB, F, H, 2H, 3H and 4H, and the pencil hardness of the polycarbonate resin composition being higher by at least two ranks than the pencil hardness of the polycarbonate resin (b) means, for example, a pencil hardness of at least HB when the pencil hardness of the polycarbonate resin (b) is 2B, a pencil hardness of at least F when the pencil hardness of the polycarbonate resin (b) is B, and a pencil hardness of at least H when the pencil hardness of the polycarbonate resin (b) is HB.

Further, as the requirement (iv), it is required that the Charpy impact strength of the polycarbonate resin composition comprising the polycarbonate resin (a) and the polycarbonate resin (b) is higher than the Charpy impact strength of the polycarbonate resin (a).

The Charpy impact strength of the polycarbonate resin composition is properly determined depending upon the shape, the purpose of use and the like of a final product, and is usually at least 8 kJ/m$^2$, preferably at least 10 kJ/m$^2$. If the Charpy impact strength is less than 8 kJ/m$^2$, the molded article of polycarbonate resin tends to be easily broken. The Charpy impact strength of the molded article of polycarbonate resin can be determined by a measurement method based on JIS K7111. The specific measurement method will be described in detail in Examples.

The polycarbonate resin (a) and the polycarbonate resin (b) having structural units different from the polycarbonate resin (a) are not particularly limited so long as the above requirements (i) to (iii) are satisfied.

As described above, the polycarbonate resin composition of the present invention comprises a polycarbonate resin (b) having a relatively low pencil hardness and a polycarbonate resin (a) having a relatively high pencil hardness in a specific weight ratio, wherein the pencil hardness of the polycarbonate resin composition is higher by at least two ranks than the polycarbonate resin (b), and the Charpy impact strength of the polycarbonate resin composition is higher than the polycarbonate resin (a).

By such a constitution, it is possible to obtain a polycarbonate resin composition which has a remarkably improved surface hardness and has a favorable color, and which has the impact strength and the moldability well balanced.

As described above, the polycarbonate resin composition of the present invention comprises a polycarbonate resin (b) having a relatively low pencil hardness and a polycarbonate resin (a) having a relatively high pencil hardness in a specific weight ratio, wherein the ratio of the viscosity average molecular weight Mv(a) of the polycarbonate resin (a) to the viscosity average molecular weight Mv(b) of the polycarbonate resin (b), Mv(a)/Mv(b), is within a specific range. Specifically, the ratio of the viscosity average molecular weight Mv(a) of the polycarbonate resin (a) to the viscosity average molecular weight Mv(b) of the polycarbonate resin (b), Mv(a)/Mv(b), is preferably at least 0.02 and at most 2.0, more preferably at least 0.3 and at most 1.5, further preferably at least 0.4 and at most 1.2. If Mv(a)/Mv(b) is less than 0.02, the surface hardness of the polycarbonate resin composition tends to be low. If Mv(a)/Mv(b) is low, the impact resistance may be decreased. Further, if Mv(a)/Mv(b) is high, the effect of improving the surface hardness tends to be small, and the surface hardness of the polycarbonate resin composition may be low. Further, the melt viscosity tends to be very high, whereby the fluidity will be deteriorated and the moldability are poor in some cases.

By the above constitution, it is possible to obtain a polycarbonate resin composition which has a high and favorable surface hardness, and is also excellent in the color and the impact resistance.

As described above, the polycarbonate resin composition of the present invention is a polycarbonate resin composition comprising a polycarbonate resin (b) having a relatively low pencil hardness and a high melt viscosity and a polycarbonate resin (a) having a relatively high pencil hardness and a low melt viscosity in a specific weight ratio. Specifically, it is required that the melt viscosity of the polycarbonate resin (b) at a temperature of 280° C. at a shear rate of 122 sec$^{-1}$ (hereinafter sometimes referred to simply as "melt viscosity of the polycarbonate resin (b)") is higher than the melt viscosity of the polycarbonate resin (a) at a temperature of 280° C. at a shear rate of 122 sec$^{-1}$ (hereinafter sometimes referred to simply as "melt viscosity of the polycarbonate resin (a)").

If this requirement is not satisfied, the effect of improving the surface hardness tends to be small, and the color may be deteriorated, such being unfavorable. The melt viscosity can be measured by a capillary rheometer "Capirograph 1C" (manufactured by TOYO SEIKI SEISAKU-SHO, LTD.) described in Examples in detail.

By the above constitution, it is possible to obtain a polycarbonate resin composition which has high strength even though it is thin, which has a high surface hardness, which has high and favorable moldability, and which is also excellent in the color and the impact resistance.

Usually, a composition of polycarbonate resins and a copolymerized polycarbonate resin having the same structural units and amounts, have the same physical properties in many cases. However, although the reason in detail is not clearly understood at present, the surface hardness of the polycarbonate resin composition comprising the polycarbonate resin (a) and the polycarbonate resin (b) of the present invention is remarkably high as compared with the surface hardness of a copolymerized polycarbonate having the same structural units in the same weight ratio as the polycarbonate resin composition.

The polycarbonate resin composition of the present invention preferably satisfies the following.

The pencil hardness of the polycarbonate resin composition of the present invention as specified by ISO 15184 is usually at least HB, preferably at least F, more preferably at least H. If the pencil hardness is low, the surface hardness tends to be low, and when it is molded into a molded article, it is easily scarred in some cases.

The yellowness index (YI) of the polycarbonate resin composition of the present invention is usually at most 4.0, preferably at most 3.5, further preferably at most 3.0, particularly preferably at most 2.5. Usually it is at most 3.0, preferably at most 2.8, further preferably at most 2.5. If YI is too high, the color tends to be deteriorated, the design as a molded article tends to be poor, and particularly in a molded article which is required to be colored, the brightness may be insufficient, and the color may be smoky.

The melt viscosity of the polycarbonate resin composition of the present invention is preferably at most 30,000 poise, more preferably at most 25,000 poise, further preferably at most 11,000 poise, particularly preferably at most 9,000 poise, at a temperature of 280° C. at a shear rate of 122 sec$^{-1}$. If the melt viscosity is at least 30,000 poise, the fluidity may be remarkably be decreased, and the moldability may be impaired. The melt viscosity is a value measured by a capillary rheometer "Capirograph 1C" (manufactured by TOYO SEIKI SEISAKU-SHO, LTD.).

The melt viscosity of the polycarbonate resin (a) is usually within a range of from 500 to 30,000 poise, preferably from 1,000 to 25,000 poise, further preferably from 1,500 to 20,000 poise.

If the melt viscosity of the polycarbonate resin (a) is too high, the effect of improving the surface hardness of the obtainable polycarbonate resin composition may be small, and the color of the molded article may be deteriorated, such being unfavorable.

Further, if the melt viscosity of the polycarbonate resin (a) is too low, the glass transition temperature (Tg) of the obtainable polycarbonate resin composition tends to be low, the heat resistance may be impaired, and the impact resistance of the obtainable polycarbonate resin composition may be low, such being unfavorable.

The melt viscosity of the polycarbonate resin (b) is usually within a range of from 1,000 to 40,000 poise, preferably from 3,000 to 30,000 poise, further preferably from 5,000 to 25,000 poise.

If the melt viscosity of the polycarbonate resin (b) is too high, the effect of improving the surface hardness of the obtainable polycarbonate resin composition may be small, and YI of the molded article may be high, such being unfavorable.

If the melt viscosity of the polycarbonate resin (b) is too low, the glass transition temperature (Tg) of the obtainable polycarbonate resin composition tends to be low, the heat resistance may be impaired, and the impact resistance of the obtainable polycarbonate resin composition may be low, such being unfavorable.

The viscosity average molecular weight of the polycarbonate resin (a) is usually within a range of from 1,000 to 100,000, preferably from 3,000 to 50,000, more preferably from 5,000 to 30,000, further preferably from 6,000 to 20,000, most preferably from 6,000 to 19,000. If the viscosity average molecular weight is too high, the melt viscosity of the polycarbonate resin composition tends to be high, and the effect of improving the surface hardness may be small, such being unfavorable. Further, if the viscosity average molecular weight is too low, the effect of improving the surface hardness of the polycarbonate resin composition tends to be small, and the impact resistance, the strength or the like may be low in some cases, such being unfavorable.

The viscosity average molecular weight of the polycarbonate resin (b) is usually within a range of from 1,000 to 100,000, preferably from 5,000 to 50,000, more preferably from 10,000 to 40,000, further preferably from 20,000 to 30,000. If the viscosity average molecular weight is too high, the melt viscosity of the polycarbonate resin composition tends to be high, whereby the fluidity may be decreased, such being unfavorable. Further, if the viscosity average molecular weight is too low, the effect of improving the surface hardness of the resin composition tends to be small, and the impact resistance, the strength or the like may be low in some cases, such being unfavorable.

Further, the present invention relates to a molded article of polycarbonate resin having structural units (a) derived from a compound represented by the following formula (1) and structural units (b) different from the structural units (a), wherein the ratio of the content [S] of the structural units (a) on the surface of the molded article of polycarbonate resin to the content [T] of the structural units (a) in the entire molded article of polycarbonate resin ([S]/[T]) is higher than 1.00 and at most 2.00:

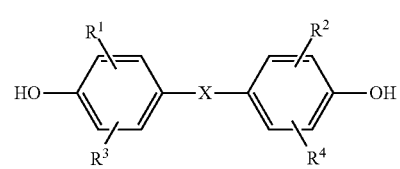

Formula (1)

wherein each of $R^1$ and $R^2$ which are independent of each other, is a substituted or non-substituted $C_{1-20}$ alkyl group or a substituted or non-substituted aryl group, each of $R^3$ and $R^4$ which are independent of each other, is a hydrogen atom, a substituted or non-substituted $C_{1-20}$ alkyl group or a substituted or non-substituted aryl group, and X is a single bond, a carbonyl group, a substituted or non-substituted alkylidene group, an oxidized or non-oxidized sulfur atom, or an oxygen atom.

The present invention is characterized in that in the molded article of polycarbonate resin having the above two types of structural units, the ratio of the content [S] of the structural units (a) on the surface of the molded article of polycarbonate resin to the content [T] of the structural units (a) in the entire molded article of polycarbonate resin ([S]/[T]) is higher than 1.00 and at most 2.00, preferably at least 1.01 and at most 1.50, further preferably at least 1.10 and at most 1.20.

That is, in the molded article of polycarbonate resin of the present invention, the content of the structural units (a) on the surface of the molded article of polycarbonate resin is higher than the content of the structural units (a) in the entire molded article of polycarbonate resin.

As mentioned above, a molded article of polycarbonate resin containing a larger amount of the structural units (a) on the surface of the molded article of polycarbonate resin, has a remarkably improved surface hardness and has a favorable color, and has improved impact resistance.

Particularly when the above [S]/[T] is at least 1.01 and at most 1.50, a molded article of polycarbonate resin which is more excellent in the surface hardness and the impact resistance will be obtained.

The content [S] of the structural units (a) on the surface of the molded article of polycarbonate resin and the content [T] of the structural units (a) in the entire molded article of polycarbonate resin can be obtained by an NMR method. More specifically, the molar composition of each structural units can be obtained by the integrated intensity ratio of signals characteristics of a dihydroxy compound observed by $^1$H-NMR measurement of a deuterochloroform solution of the molded article of polycarbonate resin using a nuclear magnetic resonance apparatus (NMR apparatus). The weight ratio of each structural units is determined from the obtained molar composition and the formula weight of each structural units.

Specific methods of obtaining the content [S] of the structural units (a) on the surface of the molded article of polycarbonate resin and the content [T] of the structural units (a) in the entire molded article of polycarbonate resin are as follows.

[I] Content [S] of Structural Units (a) on the Surface of Molded Article of Polycarbonate Resin The entire molded article of polycarbonate resin is immersed in methylene chloride at room temperature (25° C.). 5 seconds after initiation of immersion, the molded article of polycarbonate resin is taken out from methylene chloride to obtain a methylene chloride solution. Methylene chloride is removed from the methylene chloride solution to obtain a residue. The residue is dissolved in deuterochloroform, and the obtained solution is subjected to measurement by $^1$H-NMR method.

From the signal intensity of the structural units (a) and the signal intensities of other structural units in the obtained $^1$H-NMR spectrum, the proportion of the structural units (a) to all the structural units obtained in total is calculated and regarded as the content [S] (wt %) of the structural units (a) on the surface of the molded article of polycarbonate resin.

[II] Content [T] of Structural Units (a) in the Entire Molded Article of Polycarbonate Resin The entire molded article of polycarbonate resin is immersed in methylene chloride at room temperature (25° C.) and completely dissolved to obtain a methylene chloride solution. About 50 g of the methylene chloride solution is taken, and methylene chloride is removed from the methylene chloride solution to obtain a residue. The residue is dissolved in deuterochloroform, and the obtained solution is subjected to measurement by $^1$H-NMR method.

From the signal intensity of the structural units (a) and the signal intensities of other structural units in the obtained $^1$H-NMR spectrum, the proportion of the structural units (a) to all the structural units obtained in total is calculated and regarded as the content [T] (wt %) of the structural units (a) in the entire molded article.

The molded article of polycarbonate resin of the present invention is preferably an injection-molded article.

An injection-molded article has advantages in that molded articles having a complicated shape can be molded in a high cycle rate.

The pencil hardness on the surface of the molded article of polycarbonate resin of the present invention as specified by ISO 15184 is usually at least HB, preferably at least F, further preferably at least H. If the pencil hardness on the surface of the molded article of polycarbonate resin is low, the molded article is likely to be scarred in some cases. The pencil hardness ranks are, from lower ranks, 2B, B, HB, F, H, 2H, 3H and 4H.

The conditions for molding the molded article of polycarbonate resin when the surface pencil hardness is evaluated are not particularly limited, and an optional forming method may be employed.

Now, the polycarbonate resin (a) and a polycarbonate resin suitable as the polycarbonate resin (b) having structural units different from the polycarbonate resin (a), constituting the polycarbonate resin composition of the present invention, will be described.

<Polycarbonate Resin (a)>

As the polycarbonate resin (a), first, a polycarbonate resin having at least structural units (a) derived from a compound represented by the following formula (1) may be mentioned as a suitable example:

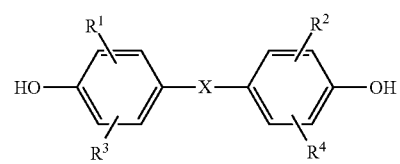

Formula (1)

wherein each of $R^1$ and $R^2$ which are independent of each other, is a substituted or non-substituted $C_{1-20}$ alkyl group or a substituted or non-substituted aryl group, each of $R^3$ and $R^4$ which are independent of each other, is a hydrogen atom, a substituted or non-substituted $C_{1-20}$ alkyl group or a substituted or non-substituted aryl group, and X is a single bond, a carbonyl group, a substituted or non-substituted alkylidene group, an oxidized or non-oxidized sulfur atom, or an oxygen atom.

In the above formula (1), as each of $R^1$ and $R^2$, the substituted or non-substituted $C_{1-20}$ alkyl group may, for example, be a methyl, ethyl, n-propyl, isopropyl, n-butyl, isobutyl, sec-butyl, tert-butyl, n-pentyl, sec-pentyl, n-hexyl, n-heptyl or n-octyl group, and the substituted or non-substituted aryl group may, for example, be a phenyl, benzyl, tolyl, 4-methylphenyl or naphthyl group.

As each of $R^3$ and $R^4$, the substituted or non-substituted $C_{1-20}$ alkyl group may, for example, be a methyl, ethyl, n-propyl, isopropyl, n-butyl, isobutyl, sec-butyl, tert-butyl, n-pentyl, sec-pentyl, n-hexyl, n-heptyl or n-octyl group, and the substituted or non-substituted aryl group may, for example, be a phenyl, benzyl, tolyl, 4-methylphenyl or naphthyl group.

Among them, each of $R^1$ and $R^2$ is preferably a methyl, ethyl, n-propyl or 4-methylphenyl group, particularly preferably a methyl group. Each of $R^3$ and $R^4$ is preferably a hydrogen atom, a methyl, ethyl, n-propyl or 4-methylphenyl group, particularly preferably a hydrogen atom. Here, the bonding positions of $R^1$, $R^2$, $R^3$ and $R^4$ in the formula (1) are optional positions selected from 2-, 3-, 5- and 6-positions relative to X on the phenyl rings, and are preferably 3-position or 5-position.

Further, in the formula (1), in a case where X is a substituted or non-substituted alkylidene group, it is represented by the following structural formulae. As X, the oxidized or not-oxidized sulfur atom may, for example, be —S— or —SO$_2$—.

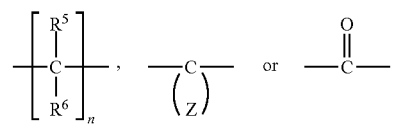

wherein each of $R^5$ and $R^6$ which are independent of each other, is a hydrogen atom, a substituted or non-substituted $C_{1-20}$ alkyl group or a substituted or non-substituted aryl group, and Z is a substituted or non-substituted $C_{4-20}$ alkylene group or a polymethylene group, and n is an integer of from 1 to 10.

As each of $R^5$ and $R^6$, the substituted or non-substituted $C_{1-20}$ alkyl group may, for example, be a methyl, ethyl, n-propyl, isopropyl, n-butyl, isobutyl, sec-butyl, tert-butyl, n-pentyl, sec-pentyl, n-hexyl, n-heptyl or n-octyl group, and the substituted or non-substituted aryl group may, for example, be a phenyl, benzyl, tolyl, 4-methylphenyl or naphthyl group.

Among them, each of $R^5$ and $R^6$ is preferably a methyl, ethyl, n-propyl or 4-methylphenyl group, particularly preferably a methyl group. It is particularly preferred that both of $R^5$ and $R^6$ are methyl groups and n is 1, that is, X in the formula (1) is an isopropylidene group.

Z in the formula (1) is bonded to the carbon atom bonded to the two phenyl groups, and forms a substituted or non-substituted bivalent carbon ring. The bivalent carbon ring may, for example, be a (preferably $C_{4-12}$) cycloalkylidene group such as a cyclopentylidene, cyclohexylidene, cycloheptylidene, cyclododecylidene or adamantylidene group, and the substituted carbon ring may, for example, be such a group having a methyl substituent or an ethyl substituent. Among them, preferred is a cyclohexylidene group, a methyl-substituted cyclohexylidene group or a cyclododecylidene group.

Among polycarbonate resins (a) having at least structural units derived from a compound represented by the above formula (1), a polycarbonate resin having structural units (a) derived from at least one compound selected from the group consisting of the following formulae (1a) to (1i) is suitably used.

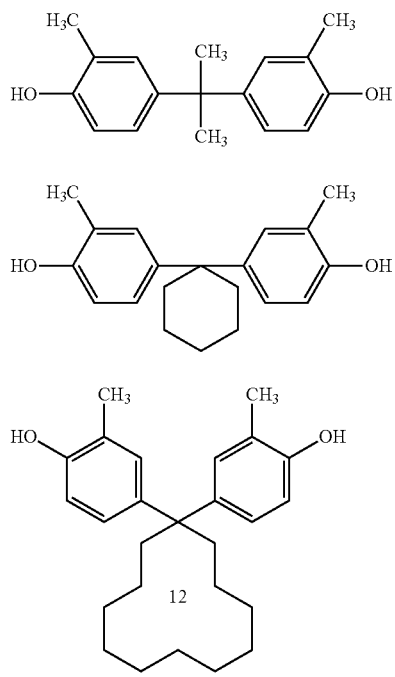

(1a)

(1b)

(1c)

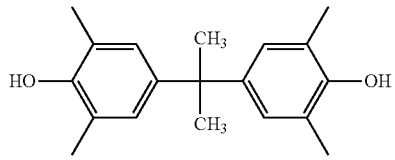

(1d)

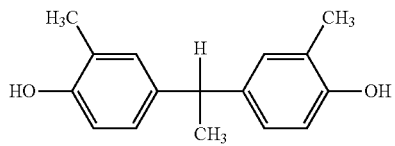

(1e)

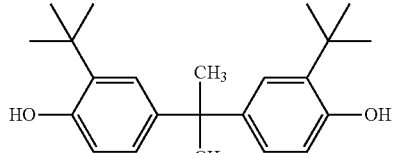

(1f)

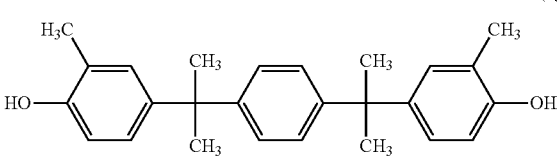

(1g)

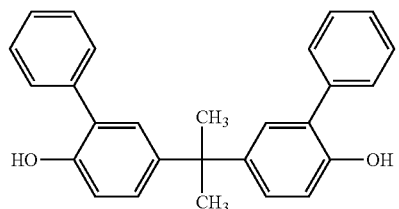

(1h)

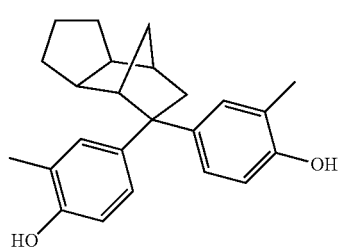

(1i)

Among the above compounds, a polycarbonate resin having structural units (a) derived from at least one compound selected from the group consisting of the above formulae (1a) to (1c) is more suitably used.

The polycarbonate resin (a) may contain structural units other than the structural units derived from the compound represented by the above formula (1), within a range not to impair the performance.

The structural units other than the structural units (a) are not particularly limited and may, for example, be specifically structural units derived from an alicyclic dihydroxy compound such as 2,2-bis(4-hydroxyphenyl)propane (hereinafter sometimes referred to as "bisphenol A") or absolute sugar alcohol, or a cyclic ether compound such as spiroglycol.

From the viewpoint of easiness of production of the molded article of polycarbonate resin of the present invention, the content of the structural units (a) in the polycarbonate resin (a) is preferably at least 50 wt %, more preferably at least 75 wt %, particularly preferably at least 95 wt % (including 100 wt %) based on 100 wt % of all the structural units in the polycarbonate resin (a).

The content of the structural units in the polycarbonate resin (a) can be obtained by the NMR method described in the above molded article of polycarbonate resin.

<Polycarbonate Resin (b)>

Then, as the polycarbonate resin (b), a polycarbonate resin having structural units (b) derived from at least one compound selected from the group consisting of the following formulae (2) to (13) is suitably used, and a bisphenol A type polycarbonate resin having mainly structural units derived from bisphenol A represented by the following formula (2) is more suitably used. Here, "having mainly structural units derived from bisphenol A" means that among the structural units constituting the polycarbonate resin (b), at least 50 wt %, preferably at least 80 wt %, more preferably at least 90 wt % are structural units derived from bisphenol A.

Here, the polycarbonate resin (b) contains the structural units (b) which are structural units other than the structural units (a) and may have structural units other than the structural units (b). Accordingly, the polycarbonate resin (b) may have structural units (a) (that is, the polycarbonate resin (b) is a copolymer having the structural units (a) and the structural units (b)).

On the other hand, if the polycarbonate resin (b) contains a large amount of the structural units (a), the color may be deteriorated, or the impact strength may be decreased, and accordingly, the proportion of the structural units (a) contained in the polycarbonate resin (b) is preferably less than 50 wt %, more preferably less than 25 wt %, and preferably less than 5 wt % (including 0 wt %), based on 100 wt % of all the structural units in the polycarbonate resin (b).

The content of the structural units in the polycarbonate resin (b) can be obtained by the NMR method. Specifically, the molar composition of each structural units can be obtained from the integrated intensity ratio of signals characteristics of a dihydroxy compound used when the polycarbonate resin (b) is prepared, observed by $^1$H-NMR measurement of a deuterochloroform solution of the polycarbonate resin (b) using a nuclear magnetic resonance apparatus (NMR apparatus). The weight ratio of each structural units is determined from the obtained molar composition and the formula weight of each structural units.

(2)
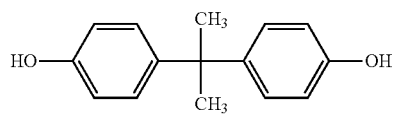

(3)
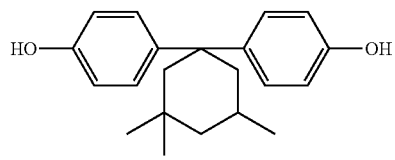

(4)
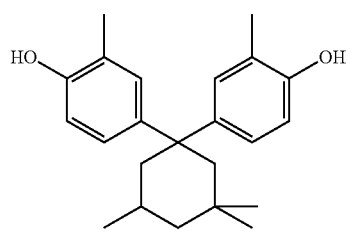

(5)
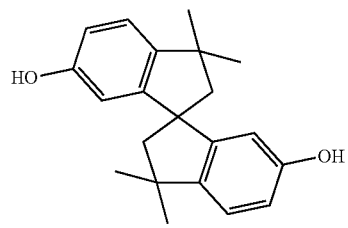

(6)
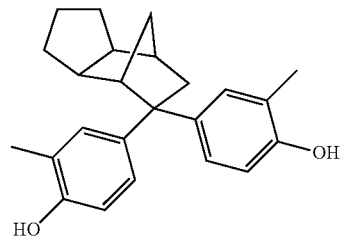

(7)
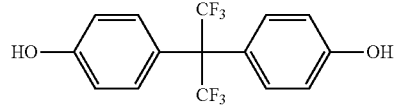

(8)
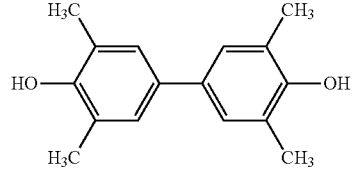

(9)
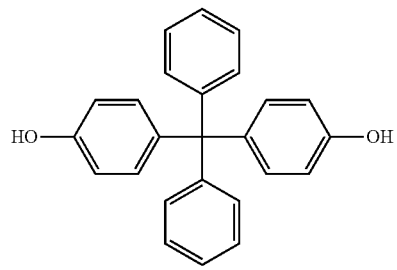

(10)
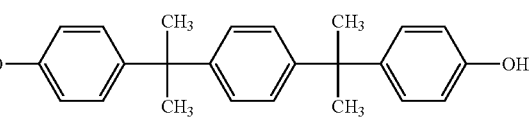

(11)
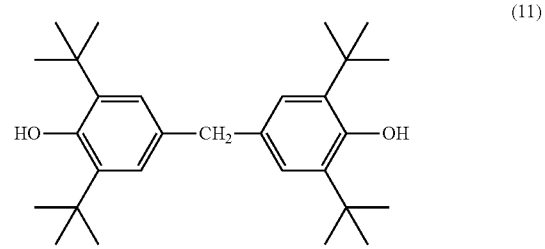

(12)
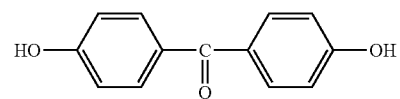

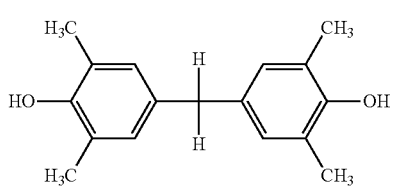

(13)

<Content of Structural Units in Molded Article of Polycarbonate Resin>

The content (average content) of the structural units (a) in the molded article of polycarbonate resin of the present invention is not particularly limited, and is usually less than 50 wt %, preferably at most 20 wt %, based on 100 wt % of all the structural units (the total of the structural units (a), the structural units (b) and other structural units) in the polycarbonate resin.

The content of the structural units in the molded article of polycarbonate resin can be obtained by the NMR method.

The molded article of polycarbonate resin of the present invention is preferably a molded article of polycarbonate resin comprising at least a polycarbonate resin (a) having structural units (a) derived from a compound represented by the above formula (1) and a polycarbonate resin (b) having structural units (b) different from the structural units (a) and having a structure different from the polycarbonate resin (a), in view of easy production.

The polycarbonate resin (b) is a polycarbonate resin having structural units (b) different from the structural units (a) and having a structure different from the polycarbonate resin (a). That is, the polycarbonate resin (b) has "a structure different" from the polycarbonate resin (a) not only when the polycarbonate resin (a) is a homopolymer comprising structural units (a) and the polycarbonate resin (b) is a homopolymer comprising structural units (b), but also when the polycarbonate resin (b) is a copolymer having structural units (a) as structural units other than the structural units (b).

In a case where the molded article of polycarbonate resin of the present invention comprises the above polycarbonate resin (a) and polycarbonate resin (b), the pencil hardness of the polycarbonate resin (a) as specified by ISO 15184 is preferably higher than the pencil hardness of the polycarbonate resin (b) as specified by ISO 15184.

If the pencil hardness of the polycarbonate resin (a) is equal to or lower than the pencil hardness of the polycarbonate resin (b), the pencil hardness of the polycarbonate resin molded article may be low, and the surface of the molded article of polycarbonate resin is likely to be scarred.

A suitable pencil hardness of the polycarbonate resin (a) is at least F by the pencil hardness as specified by ISO 15184. If the pencil hardness of the polycarbonate resin (a) is less than F, the pencil hardness of the molded article of polycarbonate resin may not sufficiently be improved in some cases.

With respect to the pencil hardnesses of the polycarbonate resin (a) and the polycarbonate resin (b), the surface hardnesses of a molded article of polycarbonate resin obtainable by a method described in the pencil hardness on the surface of the molded article of polycarbonate resin described in Examples are regarded as pencil hardnesses of the polycarbonate resin (a) and the polycarbonate resin (a).

Further, in a case where the molded article of polycarbonate resin of the present invention comprises the above polycarbonate resin (a) and polycarbonate resin (b), the viscosity average molecular weight of the polycarbonate resin (a) is preferably higher than the viscosity average molecular weight of the polycarbonate resin (b). It is estimated that a molded article of polycarbonate resin having a different content of the structural units between on the surface of the molded article of polycarbonate resin and in the entire molded article of polycarbonate resin can be obtained by such a difference in the viscosity average molecular weight.

<Method for Producing Polycarbonate Resin>

Now, the method for producing the polycarbonate resin (a) and the polycarbonate resin (b) of the present invention will be described below (hereinafter "the polycarbonate resin (a) and the polycarbonate resin (b)" will generally be referred to as "polycarbonate resin" in some cases.)

The polycarbonate resin of the present invention is obtainable by polymerization by using a dihydroxy compound and a carbonyl compound. Specifically, there are an interfacial polycondensation method (hereinafter sometimes referred to as "interfacial method") for producing a polycarbonate resin by reacting a dihydroxy compound and carbonyl chloride (hereinafter sometimes referred to as "CDC" or "phosgene" at an interface between an organic phase and an aqueous phase which are not miscible optionally, and a melt polycondensation method (hereinafter sometimes referred to as "melt method") for producing a polycarbonate resin by subjecting a dihydroxy compound and a carbonyl compound to an ester exchange reaction in a molten state in the presence of an ester exchange reaction catalyst.

Now, each of the interfacial method and the melt method may specifically be described.

<Interfacial Method>

The polycarbonate resin of the present invention by the interfacial method is usually obtained in such a manner that an alkaline aqueous solution of a dihydroxy compound is prepared (raw material preparation step), the interfacial polycondensation reaction of the dihydroxy compound and phosgene ($COCl_2$) is carried out in an organic solvent in the presence of, for example, an amine compound, as a polycondensation catalyst, followed by steps of neutralization, washing with water and drying to obtain the polycarbonate resin. Specifically, the polycarbonate resin production process by the interfacial method comprises at least a raw material preparation step of preparing raw materials such as a monomer component, an oligomerization step to carry out an oligomerization reaction, a polycondensation step of carrying out a polycondensation reaction using the oligomer, a washing step of washing the reaction liquid after the polycondensation reaction by alkali washing, acid washing and water washing, a polycarbonate resin isolation step of pre-concentrating the washed reaction liquid and isolating the polycarbonate resin after granulation, and a drying step of drying isolated polycarbonate resin particles.

In the interfacial method, usually an organic solvent is used.

Now, the respective steps will be described.

(Raw Material Preparation Step)

In the raw material preparation step, in a raw material preparation tank, a raw material of e.g. an alkaline aqueous solution of a dihydroxy compound containing a dihydroxy compound, an aqueous solution of a metal compound such as sodium hydroxide (NaOH) or magnesium hydroxide ($Mg(OH)_2$), demineralized water (DMW) and further as the case requires, a reducing agent such as hydrosulfite (HS) is prepared.

(Dihydroxy Compound)

As the dihydroxy compound which is a raw material of the polycarbonate resin of the present invention, specifically, dihydroxy compounds represented by the formulae (1a) to (1i) represented by the above formula (1) and the formulae (2) to (13) may, for example, be mentioned.

(Metal Compound)

The metal compound is usually preferably a hydroxide, such as sodium hydroxide, lithium hydroxide, potassium hydroxide, magnesium hydroxide or calcium hydroxide. Among them, sodium hydroxide is particularly preferred.

The proportion of the metal compound to the dihydroxy compound is usually from 1.0 to 1.5 (equivalent ratio), preferably from 1.02 to 1.04 (equivalent ratio). If the proportion of the metal compound is excessively high or excessively low, such may influence the terminal groups of the carbonate oligomer obtainable in the after-mentioned oligomerization step, and as a result, the polycondensation reaction tends to be abnormal.

(Oligomerization Step)

Then, in the oligomerization step, in a predetermined reactor, the alkaline aqueous solution of the dihydroxy compound prepared in the raw material preparation step and phosgene (CDC) are subjected to a phosgene reaction of the dihydroxy compound in the presence of an organic solvent such as methylene chloride ($CH_2Cl_2$).

Then, to the mixed liquid after the phosgene reaction of the dihydroxy compound, a condensation catalyst such as triethylamine (TEA) and a chain stopper such as p-t-butyl phenol (pTBP) are added, to carry out an oligomerization reaction of the dihydroxy compound.

Then, after further oligomerization reaction is allowed to proceed, the oligomerization reaction liquid of the dihydroxy compound is introduced into a predetermined static separation tank, an organic phase containing the carbonate oligomer and an aqueous phase are separated, and the separated organic phase is supplied to a polycondensation step.

Here, the retention time in the oligomerization step after the alkaline aqueous solution of the dihydroxy compound is supplied to the reactor in which the phosgene reaction of the dihydroxy compound is carried out until the oligomerization reaction liquid enters the static separation tank, is usually at most 120 minutes, preferably from 30 to 60 minutes.

(Phosgene)

Phosgene used in the oligomerization step is usually used in the form of liquid or gas. The preferred amount of use of CDC in the oligomerization step is properly selected depending upon the reaction conditions, particularly the reaction temperature and the concentration of the dihydroxy compound in the aqueous phase and is not particularly limited. Usually, the amount of CDC is from 1 to 2 mol, preferably from 1.05 to 1.5 mol, per 1 mol of the dihydroxy compound. If the amount of use of CDC is excessively large, unreacted CDC tends to increase, and the units may remarkably be deteriorated. Further, if the amount of use of CDC is excessively small, the chloroformate group amount tends to be insufficient, and no appropriate molecular weight elongation tends to be conducted.

(Organic Solvent)

In the oligomerization step, usually an organic solvent is used. The organic solvent may be any optional inert organic solvent in which phosgene and reaction products such as the carbonate oligomer and the polycarbonate resin are dissolved under the reaction temperature and the reaction pressure in the oligomerization step, and which is not miscible with water (or which does not form a solution with water).

Such an inert organic solvent may, for example, be an aliphatic hydrocarbon such as hexane or n-heptane; a chlorinated aliphatic hydrocarbon such as dichloromethane, chloroform, carbon tetrachloride, dichloroethane, trichloroethane, tetrachloroethane, dichloropropane or 1,2-dichloroethylene; an aromatic hydrocarbon such as benzene, toluene or xylene, a chlorinated aromatic hydrocarbon such as chlorobenzene, o-dichlorobenzene or chlorotoluene; or a substituted aromatic hydrocarbon such as nitrobenzene or acetophenone.

Among them, a chlorinated hydrocarbon such dichloromethane or chlorobenzene is suitably used. Such an inert organic solvent may be used alone or as a mixture with another solvent.

(Condensation Catalyst)

The oligomerization reaction may be carried out in the presence of a condensation catalyst. The timing of addition of the condensation catalyst is preferably after CDC is consumed. The condensation catalyst may optionally be selected among many condensation catalysts which have been used for a two-phase interfacial condensation method. It may, for example, be trialkylamine, M-ethylpyrrolidone, N-ethylpiperidine, N-ethylmorpholine, N-isopropylpiperidine or N-isopropylmorpholine. Among them, triethylamine or N-ethylpiperidine is preferred.

(Chain Stopper)

In this embodiment, in the oligomerization step, usually a monophenol is used as the chain stopper. The monophenol may, for example, be phenol; a $C_{1-20}$ alkylphenol such as p-t-butylphenol or p-cresol; or a halogenated phenol such as p-chlorophenol or 2,4,6-tribromophenol. The amount of use of the monophenol is properly selected depending upon the molecular weight of the obtainable carbonate oligomer, and is usually from 0.5 to 10 mol % based on the dihydroxy compound.

In the interfacial method, the molecular weight of the polycarbonate resin is determined by the amount of addition of the chain stopper such as the monophenol. Accordingly, the timing of addition of the chain stopper is preferably between immediately after completion of consumption of the carbonate-forming compound and before the molecular weight elongation starts, with a view to controlling the molecular weight of the polycarbonate resin.

If the monophenol is added when the carbonate-forming compound coexists, a condensate of the monophenol (a diphenyl carbonate) forms in a large amount, and no polycarbonate resin having a desired molecular weight tends to be obtained. If the timing of addition of the monophenol is too late, there may be such drawbacks that the molecular weight control tends to be difficult, the obtainable resin may have a specific shoulder on the low molecular side in the molecular weight distribution, and sagging may occur at the time of molding.

(Branching Agent)

Further, in the oligomerization step, an optional branching agent may be used. Such a branching agent may, for example, be 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane or 1,4-bis(4,4'-dihydroxytriphenylmethyl)benzene. Further, 2,4-dihydroxybenzoic acid, trimesic acid, cyanuric chloride or the like may also be used. Among them, a branching agent having at least three phenolic hydroxy groups is suitable. The amount of use of the branching agent is properly selected depending upon the degree of branching of the obtainable carbonate oligomer, and is usually from 0.05 to 2 mol % based on the dihydroxy compound.

In the oligomerization step, in a case where the two-phase interfacial condensation method is employed, it is preferred that prior to contact of the aqueous solution of the metal compound of the dihydroxy compound with phosgene, the organic phase containing the dihydroxy compound, the phase containing the metal compound are brought into contact with an organic phase not optionally mixed with water, to form an emulsion.

As a means of forming such an emulsion, it is preferred to use, for example, a mixing machine such as a stirring machine having a predetermined stirring blade, a dynamic mixer such as a homogenizer, a homomixer, a colloid mill, a flow jet mixer or an ultrasonic emulsifier, or a static mixer. The emulsion usually has a droplet size of from 0.01 to 10 µm, and has emulsion stability.

The emulsified state of the emulsion is usually represented by the Weber number or P/q (driver power per unit volume). The Weber number is preferably at least 10,000, more preferably at least 20,000, most preferably at least 35,000. Further, as the upper limit, at a level of at most 1,000,000 is enough. Further, P/q is preferably at least 200 kg·m/L, more preferably at least 500 kg·m/L, most preferably at least 1,000 kg·m/L.

Contact of the emulsion with CDC is preferably carried out under mixing conditions weaker than the above-described emulsifying conditions, with a view to suppressing dissolution of CDC in the organic phase. The Weber number is less than 10,000, preferably less than 5,000, more preferably less than 2,000. Further, P/q is less than 200 kg·m/L, preferably less than 100 kg·m/L, more preferably less than 50 kg·m/L. Contact with CDC can be achieved by introducing CDC into a tubular reactor or a tank-form reactor.

The reaction temperature in the oligomerization step is usually at most 80° C., preferably at most 60° C., further preferably within a range of from 10 to 50° C. The reaction time is properly selected depending upon the reaction temperature, and is usually from 0.5 minute to 10 hours, preferably from 1 minute to 2 hours. If the reaction temperature is excessively high, the side reaction cannot be controlled, and the CDC units tend to be deteriorated. If the reaction temperature is excessively low, although such is preferred with a view to controlling the reaction, the refrigeration load tends to increase, thus leading to the cost increases.

The carbonate oligomer concentration in the organic phase may be such a range that the obtainable carbonate oligomer is soluble, and specifically, it is at a level of from 10 to 40 wt %. The proportion of the organic phase is preferably from 0.2 to 1.0 by the volume ratio based on the aqueous phase containing the aqueous solution of the metal compound salt of the dihydroxy compound.

(Polycondensation Step)

Then, in the polycondensation step, the organic phase containing the carbonate oligomer separated from the aqueous phase in the static separation tank is transferred to an oligomer tank having a stirring machine. In the oligomer tank, a condensation catalyst such as triethylamine (TEA) is further added.

Then, the organic phase stirred in the oligomer tank is introduced into a predetermined polycondensation reaction tank, and then to the polycondensation reaction tank, demineralized water (DMW), an organic solvent such as methylene chloride ($CH_2Cl_2$) and a sodium hydroxide aqueous solution are supplied, stirred and mixed to carry out a polycondensation reaction of the carbonate oligomer.

The polycondensation reaction liquid in the polycondensation reaction tank is then continuously introduced successively to a plurality of polycondensation reaction tanks, whereby the polycondensation reaction of the carbonate oligomer is completed.

Here, in the polycondensation step, the retention time in the polycondensation reaction tanks in which the polycondensation reaction of the carbonate oligomer is continuously carried out is usually at most 12 hours, preferably from 0.5 to 5 hours.

As a preferred embodiment of the polycondensation step, first, the organic phase containing the carbonate oligomer and the aqueous phase are separated, and as the case requires, an inert organic solvent is added to the separated organic phase to adjust the concentration of the carbonate oligomer. In such a case, the amount of the inert organic solvent is adjusted so that the concentration of the polycarbonate resin in the organic phase obtainable by the polycondensation reaction is from 5 to 30 wt %. Then, water and an aqueous solution containing an alkali metal compound or an alkaline earth metal compound are newly added, and further, to adjust the polycondensation conditions, preferably a condensation catalyst is added, and the polycondensation reaction is carried out in accordance with the interfacial polycondensation method. The ratio of the organic phase to the aqueous phase in the polycondensation reaction is preferably such that the organic phase:the aqueous phase=1:0.2 to 1:1 by the volume ratio.

As the metal compound, the same compound as one used in the above-described oligomerization step may be mentioned. Particularly, sodium hydroxide is industrially preferred. The amount of use of the metal compound may be at least an amount with which the reaction system is always alkaline during the polycondensation reaction, and the entire amount may be added all at once at the start of the polycondensation reaction, or the metal compound may be added as properly divided during the polycondensation reaction.

If the amount of use of the metal compound is excessively large, a hydrolysis reaction as a side reaction tends to proceed. Accordingly, the concentration of the metal compound contained in the aqueous phase after completion of the polycondensation reaction is preferably adjusted to be at least 0.05 N, preferably at a level of from 0.05 to 0.3 N.

The temperature of the polycondensation reaction in the polycondensation step is usually in the vicinity of room temperature. The reaction time is from 0.5 hour to 5 hours, preferably at a level of from 1 to 3 hours.

(Washing Step)

Then, after completion of the polycondensation reaction in the polycondensation reaction tanks, the polycondensation reaction liquid is subjected to alkali washing with an alkaline washing liquid, acid washing with an acid washing liquid and water washing with washing water by a known method. The entire retention time in the washing step is usually at most 12 hours, preferably from 0.5 to 6 hours.

(Polycarbonate Resin Isolation Step)

In the polycarbonate resin isolation step, first, the polycondensation reaction liquid containing the polycarbonate resin washed in the washing step is concentrated to a predetermined solid content concentration to prepare a concentrated liquid. The solid content concentration of the polycarbonate resin in the concentrated liquid is usually from 5 to 35 wt %, preferably from 10 to 30 wt %.

Then, the concentrated liquid is continuously supplied to a predetermined granulation tank, and stirred and mixed with demineralized water (DMW) of a predetermined temperature. Further, a granulation treatment of evaporating the organic solvent while maintaining the suspended state in water is carried out to form a water slurry containing polycarbonate resin granules.

Here, the temperature of demineralized water (DMW) is usually from 37 to 67° C., preferably from 40 to 50° C. Further, the solidification temperature of the polycarbonate resin by the granulation treatment carried out in the granulation tank is usually from 37 to 67° C., preferably from 40 to 50° C.

The water slurry containing a polycarbonate resin powder continuously discharged from the granulation tank is then continuously introduced into a predetermined separator, and water is separated from the water slurry.

(Drying Step)

In the drying step, the polycarbonate resin powder after water is separated from the water slurry in the separator, is continuously supplied to a predetermined drying machine, made to stay in a predetermined retention time and then continuously withdrawn. The drying machine may, for example, be a fluidized bed drying machine. Further, a plurality of fluidized bed drying machines may be connected in series to carry out the drying treatment continuously.

Here, the drying machine usually has a heating means such as a heat medium jacket, and is maintained usually at from 0.1 to 1.0 MPa-G, preferably from 0.2 to 0.6 MPa-G, for example, by water vapor, whereby the temperature of nitrogen ($N_2$) which flows in the drying machine is maintained usually at from 100 to 200° C., preferably from 120 to 180° C.

<Melt Method>

Now, the melt method will be described.

(Dihydroxy Compound)

The dihydroxy compound as a material of the polycarbonate resin of the present invention may be the same dihydroxy compound or the like as described in the interfacial method.

(Carbonic Diester)

The carbonic diester as the material of the polycarbonate resin of the present invention may be a compound represented by the following formula (14).

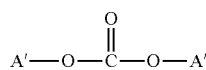

(14)

In the formula (14), A' is a $C_{1-10}$ linear, branched or cyclic monovalent hydrocarbon group which may be substituted. Two A's may be the same or different.

Furthermore, examples of a substituent in the A' include a halogen atom, a $C_{1-10}$ alkyl group, a $C_{1-10}$ alkoxy group, a phenyl group, a phenoxy group, a vinyl group, a cyano group, an ester group, an amide group and a nitro group.

Specific examples of the carbonic diester compound include diphenyl carbonate, a substituted diphenyl carbonate such as ditolyl carbonate, a dialkyl carbonate such as dimethyl carbonate, diethyl carbonate and di-t-butyl carbonate.

Among them, diphenyl carbonate (hereinafter sometimes referred to as "DPC") and a substituted diphenyl carbonate are preferred. Those carbonic diesters may be used alone or as a mixture of two or more of them.

Furthermore, the carbonic diester compound may be replaced by a dicarboxylic acid or a dicarboxylate in an amount of preferably at most 50 mol %, more preferably at most 30 mol %.

The representative examples of the dicarboxylic acid or dicarboxylate include terephthalic acid, isophthalic acid, diphenyl terephthalate and diphenyl isophthalate. When the carbonic diester is replaced by such a dicarboxylic acid or a dicarboxylate, a polyester carbonate is obtained.

In the process for producing the polycarbonate resin of the present invention by the melt method, as the amount of use of those carbonic diesters (including the above substitutional dicarboxylic acid or dicarboxylate; the same applies hereinafter), the carbonic diester compound is used in a molar ratio of usually from 1.01 to 1.30 mol, preferably from 1.02 to 1.20 mol per 1 mol of the dihydroxy compound. If the molar ratio of the carbonic diester is excessively low, the ester exchange reaction rate tends to be lowered, whereby production of a polycarbonate resin having a desired molecular weight is difficult, or the terminal hydroxy group concentration of the obtainable polycarbonate resin tends to be high, thus deteriorating the thermal stability. Further, if the molar ratio of the carbonic diester is excessively high, the ester exchange reaction rate tends to be decreased, and production of a polycarbonate resin having a desired molecular weight tends to be difficult, and in addition, an amount of the carbonic diester compound remaining in the resin becomes so large as to produce an unpleasant odor during the forming process or from a molded article, which is undesirable.

(Ester Exchange Catalyst)

The ester exchange catalyst used in the process for producing the polycarbonate resin of the present invention by the melt method, may be one of catalysts generally used in producing a polycarbonate resin by an ester exchange method, and is not particularly limited.

In general, examples of the catalyst include basic compounds such as an alkali metal compound, an alkaline earth metal compound, a beryllium compound, a magnesium compound, a basic boron compound, a basic phosphorus compound, a basic ammonium compound, and an amine compound. Among them, an alkali metal compound or an alkaline earth metal compound is practically preferred. Those ester exchange catalysts may be used alone or as a mixture of two or more of them.

The amount of use of the ester exchange catalyst is usually within a range of from $1 \times 10^{-9}$ to $1 \times 10^{-3}$ mol per 1 mol of the entire dihydroxy compound. In order to obtain a polycarbonate resin excellent in the moldability and the hue, the amount of the ester exchange catalyst is, when an alkali metal compound and/or an alkaline earth metal compound is used, preferably within a range of from $1.0 \times 10^{-8}$ to $1 \times 10^{-4}$ mol, more preferably within a range of from $1.0 \times 10^{-8}$ to $1 \times 10^{-5}$ mol, particularly preferably within a range of from $1.0 \times 10^{-7}$ to $5.0 \times 10^{-6}$ mol, per 1 mol of all the dihydroxy compounds. If the amount is smaller than the above lower limit, no polymerization activity necessary to produce a polycarbonate resin having a desired molecular weight will be obtained, and if it is larger than the above upper limit, the polymer hue may be deteriorated, or the amount of the branching component tends to be too many, thus leading to a decrease in the fluidity, whereby no desired polycarbonate resin having excellent melt properties will be obtained.

Examples of the alkali metal compound include inorganic alkali metal compounds such as hydroxides, carbonates and hydrogen carbonate compounds of alkali metals; and organic alkali metal compounds such as salts of alkali metals with alcohols, phenols or organic carboxylic acids. Examples of the alkali metals include lithium, sodium, potassium, rubidium and cesium.

Among such alkali metal compounds, a cesium compound is preferred, and cesium carbonate, cesium hydrogen carbonate and cesium hydroxide are particularly preferred.

Examples of the alkaline earth metal compound include inorganic alkaline earth metal compounds such as hydroxides or carbonates of alkaline earth metals; and salts of alkaline earth metals with alcohols, phenols or organic carboxylic acids. Examples of the alkaline earth metals include calcium, strontium and barium.

Further, examples of the beryllium compound and magnesium compound include inorganic metal compounds such as hydroxides or carbonates of the metals; and salts of those metals with alcohols, phenols or organic carboxylic acids.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline.

(Catalyst Deactivating Agent)

In the present invention, after completion of the ester exchange reaction, a catalyst deactivating agent to neutralize and deactivate the ester exchange catalyst may be added. The heat resistance and the hydrolysis resistance of a polycarbonate resin obtained by such a treatment will be improved.

Such a catalyst deactivating agent is preferably an acidic compound having pKa of at most 3, such as sulfonic acid or a sulfonate, and it may, for example, be specifically benzenesulfonic acid, p-toluenesulfonic acid, methyl benzenesulfonate, ethyl benzenesulfonate, propyl benzenesulfonate, butyl benzenesulfonate, methyl p-toluenesulfonate, ethyl p-toluenesulfonate, propyl p-toluenesulfonate or butyl p-toluenesulfonate.

Among them, p-toluenesulfonic acid or butyl p-toluenesulfonate is suitably used.

The process for producing the polycarbonate resin by the melt method is conducted by preparing a material mixture melt containing the dihydroxy compound and the carbonic diester as materials (raw material preparation step) and subjecting the material mixture melt to a multi-stage polycondensation reaction in a molten state in the presence of an ester exchange reaction catalyst using a plurality of reaction tanks (polycondensation step). The reaction method may be any of a batchwise method, a continuous method and a combination of a batchwise method and a continuous method. As the reaction tanks, a plurality of vertical stirring reaction tanks and as the case requires, at least one horizontal stirring reaction tank successive thereto are used. Usually, these reaction tanks are connected in series to carry out the treatment continuously.

After the polycondensation step, a step of terminating the reaction and evaporating and removing unreacted materials and reaction by-products in the polycondensation reaction liquid, a step of adding a thermal stabilizer, a mold release agent, a colorant or the like, a step of forming the polycarbonate resin into a predetermined particle size, or the like may properly be added.

Now, the respective steps in the production process will be described below.

(Raw Material Preparation Step)

The dihydroxy compound and the carbonic diester compound used as raw materials of the polycarbonate resin are generally prepared as a material mixture melt using a batchwise, semibatchwise or continuous stirring tank type apparatus in an atmosphere of an inert gas such as nitrogen or argon. In the case of using bisphenol A as the dihydroxy compound and diphenyl carbonate as the carbonic diester, for example, a temperature of the molten mixture is selected from a range of usually from 120 to 180° C., preferably from 125 to 160° C.

Now, a case of using bisphenol A as the dihydroxy compound and diphenyl carbonate as the carbonic diester as materials will be described as an example.

In this case, the ratio of the dihydroxy compound to the carbonic diester is adjusted so that the carbonic diester is in excess, and the carbonic diester compound is in a proportion of usually from 1.01 to 1.30 mol, preferably from 1.02 to 1.20 mol, per 1 mol of the dihydroxy compound.

(Polycondensation Step)

Polycondensation of an ester exchange reaction between the dihydroxy compound and the carbonic diester compound is continuously conducted by a multiple-stage method of generally at least two stages, preferably from 3 to 7 stages. Specific reaction conditions of each stage are as follows: the temperature is from 150 to 320° C., the pressure is from ordinary pressure to 0.01 Torr (1.3 Pa), and the average residence time is from 5 to 150 minutes.

The temperature and vacuum are generally set to become higher stepwise within the above reaction conditions in each of the reaction tanks of the multi-stage method, in order to effectively discharge the monohydroxy compound such as phenol produced as a by-product with the progress of the ester exchange reaction.

When the polycondensation step is conducted by the multi-stage method, it is preferred to provide a plurality of reaction tanks including vertical stirring reaction tanks to increase the average molecular weight of the polycarbonate resin. The number of reaction tanks is usually from 2 to 6, preferably from 4 to 5.

Here, the reaction tanks may, for example, be stirring tank type reaction tanks, thin-film reaction tanks, centrifugal thin-film evaporation reaction tanks, surface renewal type twin screw kneading reaction tanks, twin screw horizontal stirring reaction tanks, wet wall type reaction tanks, porous plate type reaction tanks in which polycondensation proceeds during a free fall, and porous plate type reaction tanks provided with a wire, in which polycondensation proceeds during a fall along a wire.

Examples of the type of the stirring blade in the vertical stirring reaction tanks include a turbine blade, a paddle blade, a Pfaudler blade, an anchor blade, a FULLZONE blade (manufactured by Kobelco Eco-Solutions Co., Ltd.), a SANMELLER blade (manufactured by MITSUBISHI HEAVY INDUSTRIES, LTD.), a MAXBLEND blade (manufactured by SHI Mechanical & Equipment Inc.), a helicalribbon blade, and a lattice type twisting blade (manufactured by Hitachi Plant Technologies, Ltd.).

Further, the horizontal stirring reaction tank refers to a reaction tank with a stirring blade a revolution axis of which is horizontal (horizontal direction). Examples of the stirring blade in the horizontal stirring reaction tank include single shaft stirring blades such as a disk type and a paddle type, and two shaft stirring blades such as HVR, SCR and N-SCR (manufactured by MITSUBISHI HEAVY INDUSTRIES, LTD.), Bivolak (manufactured by SHI Mechanical & Equipment Inc.), and a spectacle-shaped blade and a lattice type blade (manufactured by Hitachi Plant Technologies, Ltd.).

Further, the ester exchange catalyst used for the polycondensation of the dihydroxy compound and the carbonic diester compound may be generally previously prepared as an aqueous solution. The concentration of the catalyst solution is not particularly limited, and it is adjusted to an optional concentration according to the solubility of the catalyst in the solvent. As the solvent, acetone, an alcohol, toluene, phenol, water or the like may properly be selected.

In a case where water is selected as the solvent of the catalyst, the properties of the water are not particularly limited so long as kinds and concentrations of impurities contained therein are constant. Usually, distilled water, deionized water or the like is preferably used.

<Method for Producing Polycarbonate Resin Composition>

The method for producing the polycarbonate resin composition comprising the polycarbonate resin (a) and the polycarbonate resin (b) of the present invention is not particularly limited and may, for example, be (1) a method of melt-kneading the polycarbonate resin (a) and the polycarbonate resin (b);

(2) a method of melt-kneading the polycarbonate resin (a) in a molten state and the polycarbonate resin (b) in a molten state;

(3) a method of mixing the polycarbonate resin (a) and the polycarbonate resin (b) in a solution state, or (4) a method of dry-blending a polycarbonate resin (a) and the polycarbonate resin (b).

Now, the respective methods will be described.

(1) Method of Melt-Kneading Polycarbonate Resin (a) and Polycarbonate Resin (b)

Pellets or granules of the polycarbonate resin (a) and pellets or granules of the polycarbonate resin (b) are melt-kneaded by using a mixing apparatus such as a kneader, a twin screw extruder or a single screw extruder. The pellets or granules of the polycarbonate resin (a) and the pellets or granules of the polycarbonate resin (b) may preliminarily be mixed in a solid state and then kneaded, or either one of them is preliminarily melted in the above mixing apparatus, and the other polycarbonate resin is added and kneaded. The temperature at which they are kneaded is not particularly limited, and is preferably at least 240° C., more preferably at least 260° C., further preferably at least 280° C.

Further, it is preferably at most 350° C., particularly preferably at most 320° C. If the kneading temperature is too low, mixing of the polycarbonate resin (a) and the polycarbonate resin (b) will not be complete, and when a molded article is molded, there may be dispersion of the hardness or the impact resistance, such being unfavorable. Further, if the kneading temperature is too high, the color of the polycarbonate resin composition may be deteriorated, such being unfavorable.

(2) Method of Melt-Kneading Polycarbonate Resin (a) in Molten State and Polycarbonate Resin (b) in Molten State The polycarbonate resin (a) in a molten state and the polycarbonate resin (b) in a molten state are mixed by means of a mixing apparatus such as a stirring tank, a static mixer, a kneader, a twin screw extruder or a single screw extruder. In this case, for example, a polycarbonate resin obtained by the melt polymerization method may be introduced into the above mixing apparatus in a molten state without cooling and solidification. The mixing temperature is not particularly limited, and is preferably at least 150° C., more preferably at least 180° C., further preferably at least 200° C. Further, it is preferably at most 300° C., particularly preferably at most 250° C. If the mixing temperature is low, mixing of the polycarbonate resin (a) and the polycarbonate resin (b) will not be complete, and when a molded article is molded, there may be dispersion of the hardness or the impact resistance, such being unfavorable. Further, if the mixing temperature is too high, the color of the polycarbonate resin composition may be deteriorated, such being unfavorable.

(3) Method of Mixing Polycarbonate Resin (a) and Polycarbonate Resin (b) in Solution State The polycarbonate resin (a) and the polycarbonate resin (b) are dissolved in an appropriate solvent to form solutions, they are mixed in a solution state and then a polycarbonate resin composition is isolated. Such a proper solvent may, for example, be an aliphatic hydrocarbon such as hexane or n-heptane; a chlorinated aliphatic hydrocarbon such as dichloromethane, chloroform, carbon tetrachloride, dichloroethane, trichloroethane, tetrachloroethane, dichloropropane or 1,2-dichloroethylene; an aromatic hydrocarbon such as benzene, toluene or xylene; or a substituted aromatic hydrocarbon such as nitrobenzene or acetophenone. Among them, a chlorinated hydrocarbon such as dichloromethane or chlorobenzene is suitably used. Such a solvent may be used alone or as a mixture with another solvent.

The mixing apparatus may, for example, be a stirring tank or a static mixer. Further, the mixing temperature is not particularly limited so long as the polycarbonate resin (a) and the polycarbonate resin (b) are soluble, and is usually at most the boiling point of the solvent used.

(4) Method of Dry-Blending Polycarbonate Resin (a) and Polycarbonate Resin (b)

Pellets or granules of the polycarbonate resin (a) and pellets or granules of the polycarbonate resin (b) are dry-blended by using a tumbler, a super mixer, a Henschel mixer, a nauta mixer or the like.

Among the above methods (1) to (4), preferred are the methods (1) and (2) of melt-kneading the polycarbonate resin (a) and the polycarbonate resin (b) and the method (4) of dry-blending the polycarbonate resin (a) and the polycarbonate resin (b).

In production of the polycarbonate resin composition of the present invention, in any of the above methods, a pigment, a dye, a mold release agent, a thermal stabilizer or the like may properly be added within a range not to impair the objects of the present invention.

(Flame Retardant)

The flame retardant used in this embodiment may, for example, be at least one member selected from the group consisting of a metal sulfonate type flame retardant, a halogen-containing compound type flame retardant, a phosphorus-containing compound type flame retardant and a silicon-containing compound type flame retardant. Among them, a metal sulfonate type flame retardant is preferred.

The blending amount of the flame retardant used in this embodiment is usually from 0.01 to 1 part by weight, preferably from 0.05 to 1 part by weight per 100 parts by weight of the polycarbonate resin.

The metal sulfonate type flame retardant may, for example, be a metal aliphatic sulfonate or a metal aromatic sulfonate. The metal of such a metal salt may, for example, be an alkali metal such as sodium, lithium, potassium, rubidium or cesium; beryllium or a magnesium such as magnesium; or an alkaline earth metal such as calcium, strontium or barium. The metal sulfonate may be used alone or as a mixture of two or more.

The metal sulfonate may, for example, be a metal aromatic sulfone sulfonate or a metal perfluoroalkane sulfonate.

The metal aromatic sulfone sulfonate may, for example, be specifically sodium diphenylsulfone-3-sulfonate, potassium diphenylsulfone-3-sulfonate, sodium 4,4'-dibromodiphenyl-sulfone-3-sulfonate, potassium 4,4'-dibromodiphenyl-sulfone-3-sulfone, calcium 4-chloro-4'-nitrodiphenylsulfone-3-sulfonate, disodium diphenylsulfone-3,3'-disulfonate or dipotassium diphenylsulfone-3,3'-disulfonate.

The metal perfluoroalkane sulfonate may, for example, be sodium perfluorobutane sulfonate, potassium perfluorobutane sulfonate, sodium perfluoromethylbutane sulfonate, potassium perfluoromethylbutane sulfonate, sodium perfluorooctane sulfonate, potassium perfluorooctane sulfonate or a tetraethylammonium salt of perfluorobutane sulfonate.

The halogen-containing compound type flame retardant may, for example, be specifically tetrabromobisphenol A, tribromophenol, brominated aromatic triazine, a tetrabromobisphenol A epoxy oligomer, a tetrabromobisphenol A epoxy polymer, decabromodiphenyl oxide, tribromoallyl ether, a tetrabromobisphenol A carbonate oligomer, ethylenebistetrabromophthalimide, decabromodiphenylethane, brominated polystyrene or hexabromocyclododecane.

The phosphorus-containing compound type flame retardant may, for example, be red phosphorus, covered red phosphorus, a polyphosphate compound, a phosphate compound or a phosphazene compound. Among them, the phosphate compound may, for example, be specifically trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, diisopropylphenyl phosphate, tris(chloroethyl)phosphate, tris(dichloropropyl)phosphate, tris(chloropropyl)phosphate, bis(2,3-dibromopropyl)-2,3-dichloropropyl phosphate, tris(2,3-dibromopropyl) phosphate, bis(chloropropyl)monooctyl phosphate, bisphenol A bisphosphate, hydroquinone bisphosphate, resorcin bisphosphate or trioxybenzene triphosphate.

The silicon-containing compound type flame retardant may, for example, be silicone varnish, a silicone resin wherein substituents bonded to silicon atoms are an aromatic hydrocarbon group and an aliphatic hydrocarbon group having at least 2 carbon atoms, a silicone compound having a branched main chain and having an aromatic group in the organic functional group contained, a silicone powder having a polydiorganosiloxane polymer which may have functional groups supported on the surface of a silica powder, or an organopolysiloxane-polycarbonate copolymer.

The polycarbonate resin composition to which this embodiment is applicable, which comprises a combination of the polycarbonate resin having structural units represented by the above formula (1) and the flame retardant, has flame retardancy improved as compared with a resin composition using a polycarbonate resin obtainable by using bisphenol A as a raw material monomer (hereinafter referred to as "A-PC").

The reason why the flame retardancy of the polycarbonate resin composition to which this embodiment is applicable is improved is not clearly understood, but is considered to be as follows, with reference to a case of using a polycarbonate resin obtained by using 2,2-bis(3-methyl-4-hydroxyphenyl)propane which is an aromatic dihydroxy compound as the raw material monomer (hereinafter referred to as "C-PC") as the polycarbonate resin component, as an example.

That is, C-PC has a low thermal decomposition starting temperature as compared with A-PC and is likely to be decomposed. Thus, C-PC is quickly decomposed and graphitized, thus forming a heat insulating layer (char), whereby flame retardancy is easily attained. The low thermal decomposition starting temperature of C-PC as compared with A-PC is influenced by the difference in the structure of the bisphenol structure that "the 3-position of each of the two benzene rings is substituted by a methyl group". Particularly in a case where C-PC is produced by the above-described melt method, when the polymerization reaction proceeds in a molten state at high temperature and at high shear strength, a branch is likely to form from the 3-position of each of the phenyl rings of the bisphenol compound. Accordingly, the flame retardancy is improved such that in a flame test, flaming drips are suppressed.

Further, C-PC has a lowered packing density of molecular chains as compared with A-PC and has molecular chains which are rigid and hardly move, and thus the molded article of resin tends to have a low shrinkage and a low linear expansion coefficient. Thus, high dimensional stability of the molded article of resin is expected.

The polycarbonate resin composition to which this embodiment is applicable, which has such properties, is suitable for resin members for which high dimensional accuracy is required, such as chassis for precision instruments such as cellular phones and PCs; housing for home electric appliances such as TVs; screen films; exterior members of a multicolor molded article of resin of two or more colors, such as glazing; and multilayered extruded articles having at least two surface layers of building materials such as carports, agricultural greenhouses and acoustic insulation boards.

Further, the polycarbonate resin composition to which this embodiment is applicable, with which a molded article of resin having high hardness and improved flame retardancy can be obtained, is suitable for applications of e.g. molded articles of resin related to illumination such as LED, such as lamp lenses, protective covers and diffusers; lenses for glasses, vending machine buttons, and keys of e.g. mobile devices.

With the polycarbonate resin composition to which this embodiment is applicable, various additives are blended as the case requires. The additives may, for example, be a stabilizer, an ultraviolet absorber, a mold release agent, a colorant, an antistatic agent, a thermoplastic resin, a thermoplastic elastomer, glass fibers, glass flakes, glass beads, carbon fibers, Wollastonite, calcium silicate and aluminum borate whiskers.

The method of mixing the polycarbonate resin and the flame retardant and the additives or the like blended as the case requires is not particularly limited. In this embodiment, for example, a method of mixing the polycarbonate resin in a solid state such as pellets or a powder with the flame retardant and the like, followed by kneading e.g. by an extruder, a method of mixing the polycarbonate resin in a molten state and the flame retardant and the like, and a method of adding the flame retardant and the like during the polymerization reaction of the raw material monomer by the melt method or the interfacial method, or when the polymerization reaction is completed.

<Method for Producing Molded Article of Polycarbonate Resin>

To produce a molded article of resin from the polycarbonate resin composition of the present invention, a conventional extruder or injection molding machine is used.

The molded article of polycarbonate resin of the present invention is preferably molded by injection molding using an injection molding machine, in view of advantages such that molded articles of polycarbonate resin having a complicated shape can be molded with a high cycle rate.

The molding temperature is not particularly limited but is preferably at least 200° C., more preferably at least 250° C., most preferably at least 280° C. Further, it is preferably at most 350° C., particularly preferably at most 320° C. If the molding temperature is too low, the melt viscosity tends to be high, the fluidity tends to be decreased, the moldability may be decreased, the effects of improving the surface hardness may be decreased, and the surface hardness of the obtainable resin composition may be decreased. If the molding temperature is too high, the polycarbonate resin will be colored, whereby the color of the polycarbonate resin composition is also deteriorated in some cases, such being unfavorable.

<Method for Producing Injection-Molded Article>

To produce an injection-molded article from the polycarbonate resin composition of the present invention, a conventional injection molding machine is used.

When an injection molding machine or the like is used, the mold temperature is not particularly limited but is preferably at most 150° C., more preferably at most 120° C., most preferably at most 100° C. Further, it is preferably at least 30° C., particularly preferably at least 50° C. If the mold temperature is too high, the cooling time at the time of molding is required to be long, whereby the cycle of production of the molded article tends to be long, thus decreasing the productivity in some cases. If the mold temperature is too low, the melt viscosity of the resin composition tends to be too high, whereby no uniform molded article may be obtained, and problems may arise such that the molded article surface is non-uniform, such being unfavorable.

<Method for Producing Extruded Article>

To produce an extruded article from the polycarbonate resin composition of the present invention, a conventional extruder is used. The extruder is usually provided with a T-die, a round die or the like, and extruded articles of various shapes can be obtained. The obtained extruded article may, for example, be a sheet, a film, a plate, a tube or a pipe. Among them, a sheet or a film is preferred.

In order to improve the adhesion, coating properties and printing properties of the extruded article of the polycarbonate resin composition of the present invention, a hard coating layer may be laminated on both sides or one side of the extruded article, a weather resistance and/or scratch resistance improving film may be heat-laminated on both sides or one side of the extruded article, or embossing or translucent or opaque treatment may be applied to the surface.

Further, when injection molding or extrusion is carried out, a pigment, a dye, a mold release agent, a thermal stabilizer or the like may properly be added within a range not to impair the objects of the present invention.

The above-mentioned molded article may be used in various fields of buildings, vehicles, electric/electronic devices, machines and others.

<Flame Retardancy of Molded Article of Polycarbonate Resin>

A molded article of polycarbonate resin is prepared by using the polycarbonate resin composition to which this embodiment is applicable as described above. The method of molding the molded article of polycarbonate resin is not particularly limited, and for example, a molding method using a conventional molding machine such as an injection molding machine may be mentioned. The molded article of polycarbonate resin to which this embodiment is applicable has a decrease in the surface hardness and the transparency suppressed and has favorable flame retardancy, as compared with a case of using, for example, a polycarbonate resin obtainable by using e.g. bisphenol A having no substituent on the phenyl group as a monomer.

Specifically, the molded article of polycarbonate resin to which this embodiment is applicable, with respect to the flame retardancy, preferably satisfies the classification V-0 in a flammability test of UL94 with respect to a test specimen having a thickness of at most 2 mm. With respect to the transparency, the haze is preferably at most 1.0 with respect to a test specimen having a thickness of 3 mm in accordance with JIS K7136.

EXAMPLES

Now, the present invention will be described in further detail with reference to Examples. However, it should be understood that the present invention is not limited to the following Examples. Physical properties of polycarbonate resins and compositions used in Examples were evaluated by the following methods.

(1) Pencil Hardness of Molded Article

Using an injection molding machine J50E2 (manufactured by Japan Steel Works, Ltd.), a plate (molded article) of a polycarbonate resin or a plate (molded article) of a polycarbonate resin composition of 60 mm×60 mm×3 mm in thickness was injection-molded under conditions of a barrel temperature of 280° C. and a mold temperature of 90° C. With respect to each molded articles, in accordance with ISO 15184 using a pencil hardness tester (manufactured by Toyo Seiki Seisaku-sho, Ltd.), the pencil hardness measured at a load of 750 g was obtained.

(2) Charpy Impact Strength of Polycarbonate Resin or Polycarbonate Resin Composition Using an injection molding machine J50E2 (manufactured by Japan Steel Works, Ltd.), a polycarbonate resin or a polycarbonate resin composition was molded to obtain a molded specimen under conditions of a barrel temperature of 280° C. and a mold temperature of 90° C. Using this molded specimen, in accordance with JIS K7111, the Charpy impact strength was measured with a notch of 0.25 mmR.

(3) Yellowness Index (YI) of Polycarbonate Resin or Polycarbonate Resin Composition Using the molded article molded in the above (1), the yellowness index (YI) was measured by a spectral colorimeter CM-3700d (manufactured by KONICA MINOLTA HOLDINGS, INC.). The smaller the value, the better the color.

(4) Viscosity Average Molecular Weight (Mv)

A polycarbonate resin was dissolved in methylene chloride (concentration: 6.0 g/L), and the specific viscosity (ηsp) at 20° C. was measured by using an Ubbelohde viscosity tube, and the viscosity average molecular weight (Mv) was calculated in accordance with the following formula.

$$\eta sp/C + [\eta](1+0.28\eta sp)$$

$$[\eta]=1.23\times10^{-4}Mv^{0.83}$$

(5) Melt Viscosity

It was measured with respect to a polycarbonate resin or a polycarbonate resin composition dried at 120° C. for 5 hours by using a capillary rheometer "Capirograph 1C" (manufactured by Toyo Seiki Seisaku-sho, Ltd.) equipped with a die of 1 mm in diameter×30 mm at 280° C. at a shear rate of 122 (sec$^{-1}$). If this melt viscosity is too high, the fluidity tends to be low, and the flowabilities will be deteriorated, and accordingly it is required to be within an appropriate range.

(6) Pencil Hardness of Extruded Article

A polycarbonate resin or a polycarbonate resin composition having a thickness of 240 μm and a width of 140±5 mm was extruded into a sheet (extruded article) by using a 25 mmφ single screw extruder (manufactured by ISUZU KAKOKI K.K.) under conditions of a barrel temperature of 280° C. and a roll temperature of 90° C. With respect to this extruded article, in accordance with ISO 15184, using a pencil hardness tester (manufactured by Toyo Seiki Seisaku-sho, Ltd.), the pencil hardness measured at a load of 750 g was obtained.

(7) Yellowness Index (YI) of Extruded Article

With respect to the extruded article molded in the above (6), the yellowness index (YI) was measured by a spectral colorimeter CM-3700d (manufactured by KONICA MINOLTA HOLDINGS, INC.). The smaller the value, the better the color.

(8) Pencil Hardness of Polycarbonate Resin Cast Article

In a case where the molecular weight of the polycarbonate resin is low and a molded article for evaluation of the pencil hardness cannot be molded by the above-described method (1), an evaluation sample was prepared as follows.

100 g of a polycarbonate resin was added in a glass vessel equipped with a stirring blade, followed by replacement with nitrogen, and the pressure in the glass vessel was maintained at 101.3 kPa (760 Torr) by the absolute pressure. The glass vessel was immersed in an oil bath heated at 280° C. to melt the polycarbonate resin. After the polycarbonate resin was uniformly melted, the molten polycarbonate resin was taken out from the glass vessel into a stainless steel vat in a thickness of about 3 mm and cooled to room temperature. With respect to the cooled polycarbonate resin, in accordance with ISO 15184, using a pencil hardness tester (manufactured by Toyo Seiki Seisaku-sho, Ltd.), the pencil hardness at a load of 750 g was measured.

(9) Glass Transition Temperature (Tg)

Using a differential scanning calorimeter DSC6220 (manufactured by Seiko Instruments Inc.), about 10 mg of a polycarbonate resin sample was heated at a heating rate of 20° C./min and the calorie is measured, and in accordance with JIS K7121, an extrapolated glass transition starting temperature which is a temperature at the intersection of a line obtained by extending the base line on the low temperature side to the high temperature side and a tangent drawn at a point where the gradient of a curve of the stepwise change portion of glass transition was maximum, was obtained. This extrapolated glass transition starting temperature was regarded as the glass transition temperature (Tg).

(10) Pencil Hardness on the Surface of Molded Article of Polycarbonate Resin

A polycarbonate resin or a polycarbonate resin composition was molded into a molded article of polycarbonate resin of 60 mm×60 mm×3 mm in thickness by an injection molding machine J50E2 (manufactured by Japan Steel Works, Ltd.) under conditions of a barrel temperature of 280° C. and a mold temperature of 90° C. With respect to the molded article of polycarbonate resin, in accordance with ISO 15184, using a pencil hardness tester (manufactured by Toyo Seiki Seisaku-sho, Ltd.), the pencil hardness measured at a load of 750 g was obtained.

(11) Charpy Impact Strength of Molded Article of Polycarbonate Resin

A polycarbonate resin or a polycarbonate resin composition was molded into a molded article of polycarbonate resin having a shape based on JIS K7111 by using an injection molding machine J50E2 (manufactured by Japan Steel Works, Ltd.) under conditions of a barrel temperature of 280° C. and a mold temperature of 90° C. Using the molded article of polycarbonate resin, the Charpy impact strength was measured with a notch of 0.25 mmR in accordance with JIS K7111.

(12) Viscosity Average Molecular Weight (Mv) of Polycarbonate Resin

A polycarbonate resin was dissolved in methylene chloride (concentration: 6.0 g/L), the specific viscosity (ηsp) at 20° C. was measured by using an Ubbelohde viscosity tube, and the viscosity average molecular weight (Mv) was calculated in accordance with the following formula.

$$\eta sp/C=[\eta](1+0.28\eta sp)$$

$$[\eta]=1.23\times10^{-4}Mv^{0.83}$$

(13) Intrinsic Viscosity [η] of Polycarbonate Resin

A polycarbonate resin was dissolved in methylene chloride to form a solution (6.0 g/L). Then, with respect to this solution, the intrinsic viscosity was measured by an Ubbelohde viscosity tube at a temperature of 20° C.

(14) Content [S] of Structural Units (a) on the Surface of Molded Article of Polycarbonate Resin.

A polycarbonate resin or a polycarbonate resin composition was molded into a molded article of polycarbonate resin of 60 mm×60 mm×3 mm in thickness by an injection molding machine J50E2 (manufactured by Japan Steel Works, Ltd.) under conditions of a barrel temperature of 280° C. and a mold temperature of 90° C. Then, the molded article of polycarbonate resin was immersed in methylene chloride (about 400 g) at room temperature (25° C.). Five seconds after the start of immersion, the molded article of polycarbonate resin was taken out from methylene chloride to obtain a methylene chloride solution. By means of an evaporator, methylene chloride was removed under reduced pressure from the methylene chloride solution to obtain a residue. The residue was dissolved in deuterochloroform, and the solution was subjected to measurement by $^1$H-NMR method. From the signal intensity of structural units (a) and signal intensities of other structural units in the obtained $^1$H-NMR spectrum, the content [S] (wt %) of the structural units (a) on the surface of the molded article of polycarbonate resin was calculated.

(15) Content [T] of Structural Units (a) in the Entire Molded Article of Polycarbonate Resin In the same manner as the above (14), a molded article of polycarbonate resin of 60 mm×60 mm×3 mm in thickness was molded. Then, the molded article of polycarbonate resin was immersed in methylene chloride (about 400 g) at room temperature (25° C.) and was completely dissolved, to obtain a methylene chloride solution. About 50 g of the methylene chloride solution was taken, methylene chloride was removed under reduced pressure by means of an evaporator to obtain a residue. The residue was dissolved in deuterochloroform, and the solution was subjected to measurement by $^1$H-NMR method. From the signal intensity of structural units (a) and the signal intensities of other structural units in the obtained $^1$H-NMR spectrum, the content [T] (wt %) of the structural units (a) in the entire molded article was calculated.

The polycarbonate resins used in Examples and Comparative Examples are as follows.

(1) Polycarbonate Resin (a)

(Reference Example 1): Preparation of PC(a1)
(BPC Homopolymer, Melt Method)

To 37.60 kg (about 147 mol) of 2,2-bis(4-hydroxy-3-methylphenyl)propane (hereinafter sometimes referred to as "BPC") (manufactured by HONSHU CHEMICAL INDUSTRY CO., LTD.) as a material dihydroxy compound and 32.20 kg (about 150 mol) of diphenyl carbonate (DPC), an aqueous solution of cesium carbonate was added so that cesium carbonate would be 2 µmol per 1 mol of the dihydroxy compound to prepare a mixture. Then, the mixture was charged into a first reactor having an internal volume of 200 L equipped with a stirring machine, a heat medium jacket, a vacuum pump and a reflux condenser.

Then, an operation of reducing the pressure in the first reactor to 1.33 kPa (10 Torr) and then recovering it to the atmospheric pressure by nitrogen was repeatedly carried out five times, and then the interior in the first reactor was replaced with nitrogen. After replacement with nitrogen, a heat medium at a temperature of 230° C. was passed through the heat medium jacket to gradually increase the internal temperature in the first reactor thereby to dissolve the mixture. Then, the stirring machine was rotated at 300 rpm, and the temperature in the heat medium jacket was controlled to keep the internal temperature of the first reactor at 220° C. Then, while phenol formed as a by-product by an oligomerization reaction of BPC and DPC conducted in the interior of the first reactor was distilled off, the pressure in the first reactor was reduced from 101.3 kPa (760 Torr) to 13.3 kPa (100 Torr) by the absolute pressure over a period of 40 minutes.

Then, the pressure in the first reactor was maintained at 13.3 kPa, and while phenol was further distilled off, an ester exchange reaction was carried out for 80 minutes.

Further, the pressure in the system was recovered to 101.3 kPa by the absolute pressure with nitrogen, and then the pressure was elevated to 0.2 mPa by the gauge pressure, and by means of a transfer pipe preliminarily heated to at least 200° C., the oligomer in the first reactor was pumped to a second reactor. The second reactor had an internal volume of 200 L, was equipped with a stirring machine, a heat medium jacket, a vacuum pump and a reflux condenser, and had the internal pressure and the internal temperature controlled to the atmospheric pressure and 240° C.

Then, the oligomer pumped to the second reactor was stirred at 38 rpm, the internal temperature was raised by the heat medium jacket, and the pressure in the second reactor was reduced from 101.3 kPa to 13.3 kPa by the absolute pressure over a period of 40 minutes. Then, the temperature-raising was continued, and the internal pressure was reduced from 13.3 kPa to 399 Pa (3 Torr) by the absolute pressure further over a period of 40 minutes, and distilled phenol was removed out of the system. Further, the temperature raising was continued, and after the absolute pressure in the second reactor reached 70 Pa (about 0.5 Torr), the pressure was maintained at 70 Pa, and a polycondensation reaction was carried out. The final internal temperature in the second reactor was 285° C. When the stirring machine of the second reactor achieved a preliminarily described predetermined stirring power, the polycondensation reaction was completed.

Then, the pressure in the second reactor was recovered to 101.3 kPa by the absolute pressure with nitrogen, and the pressure was elevated to 0.2 mPa by the gauge pressure, and a polycarbonate resin was withdrawn from the bottom of the second reactor in the form of strands, which were pelletized by using a rotary cutter while cooling in a water tank. The viscosity average molecular weight of the obtained polycarbonate resin was 18,500. The melt viscosity was 2,361 Poise.

(Reference Example 2): Preparation of PC(a2)
(BPC Homopolymer, Interfacial Method)

360 parts by weight of BPC (manufactured by HONSHU CHEMICAL INDUSTRY CO., LTD.) as the material dihydroxy compound, 585.1 parts by weight of a 25 wt % sodium hydroxide (NaOH) aqueous solution and 1,721.5 parts by weight of water, in the presence of 0.41 part by weight of hydrosulfite, were dissolved at 40° C. and then cooled to 20° C. to obtain a BPC aqueous solution. This BPC aqueous solution in a rate of 8.87 kg/hour (the amount per one hour, the same applies hereinafter) and methylene chloride in a rate of 4.50 kg/hour were introduced into a 1.8 L glass first reactor equipped with a reflux condenser, a stirring machine and a coolant jacket, and were brought into contact with phosgene at room temperature separately supplied thereto in a rate of 0.672 kg/hour. The reaction temperature at this time reached 35° C. Then, the reaction liquid/reaction gas mixture was introduced into a subsequent second reactor (1.8 L) having the same shape as the first reactor by means of an overflow tube attached to the reactor and reacted. Into the second reactor, separately, p-t-butylphenol (8 wt % methylene chloride solution) as a molecular weight adjusting agent was introduced in a rate of 0.097 kg/hour. Then, the reaction liquid/reaction gas was introduced into an oligomerization tank (4.5 L) having the same shape as the first reactor through an overflow tube attached to the second reactor. Into the oligomerization tank, separately, a 2 wt % trimethylamine aqueous solution as a catalyst was introduced in a rate of 0.020 kg/hour. Then, the oligomerized emulsion thus obtained was further introduced into a separation tank (settler) having an internal volume of 5.4 L to separate an aqueous phase and an oil phase, thereby to obtain a methylene chloride solution of the oligomer.

2.60 kg of the above methylene chloride solution of the oligomer was charged into a reaction tank having an internal volume of 6.8 L equipped with a paddle blade, and 2.44 kg of methylene chloride for dilution was added, and further 0.278 kg of a 25 wt % sodium hydroxide aqueous solution, 0.927 kg of water, 8.37 g of a 2 wt % triethylamine aqueous solution and 25.8 g of p-t-butylphenol (8 wt % methylene chloride solution) were added, followed by stirring at 10° C. to carry out a polycondensation reaction for 180 minutes.

3.12 kg of the polycondensation reaction liquid was charged into a reaction tank having an internal volume of 5.4 L equipped with a paddle blade, and 2.54 kg of methylene chloride and 0.575 kg of water were added, followed by stirring for 15 minutes, and then stirring was stopped, and an aqueous phase and an organic phase were separated. To the separated organic phase, 1.16 kg of 0.1 N hydrochloric acid was added, followed by stirring for 15 minutes, to extract triethylamine and an alkali component remaining in a small amount, and then stirring was stopped, and an aqueous phase and an organic phase were separated. Further, to the separated organic phase, 1.16 kg of pure water was added, followed by stirring for 15 minutes, and then stirring was stopped, and an aqueous phase and an organic phase was separated. This operation was repeated three times. The obtained polycarbonate solution was fed into warm water of from 60 to 75° C. to powder the polycarbonate resin, followed by drying to obtain a powdery polycarbonate resin. The viscosity average molecular weight of the obtained polycarbonate resin was 9,500.

(Reference Example 3): Preparation of PC (a3) (Bis-OCZ Homopolymer, Melt Method)

The same operation as in Reference Example 1 was carried out except that 43.48 kg of 1,1-bis(4-hydroxy-3-methylphenyl)cyclohexane (hereinafter sometimes referred to as "bis-OCZ") (manufactured by HONSHU CHEMICAL INDUSTRY CO., LTD.) was used instead of BPC as the material dihydroxy compound, and the aqueous solution of cesium carbonate was added so that cesium carbonate would be 5 μmol per 1 mol of the dihydroxy compound. The viscosity average molecular weight of the obtained polycarbonate resin was 10,200. The melt viscosity was 1,641 Poise.

(Reference Example 4): Preparation of PC(a4) (BPC/BPA (50/50 wt %) Copolymer, Melt Method)

A polycarbonate resin was obtained in the same manner as in Reference Example 1 except that 17.71 kg of BPC (manufactured by HONSHU CHEMICAL INDUSTRY CO., LTD.) and bisphenol A (hereinafter sometimes referred to as "BPA") (manufactured by Mitsubishi Chemical Corporation) were used instead of BPC as the material dihydroxy compounds. The viscosity average molecular weight of the obtained polycarbonate resin was 19,800.

(Reference Example 5): Preparation of PC(a5) (BPC/BPA (30/70 wt %) Copolymer, Melt Method)

A polycarbonate resin was obtained in the same manner as in Reference Example 1 except that 10.38 kg of BPC (manufactured by HONSHU CHEMICAL INDUSTRY CO., LTD.) and 24.22 kg of BPA (manufactured by Mitsubishi Chemical Corporation) were used instead of BPC as the material dihydroxy compounds. The viscosity average molecular weight of the obtained polycarbonate resin was 20,300.

(Reference Example 6): Preparation of PC(a6) (BPC/BPA (10/90 wt %) Copolymer, Melt Method)

A polycarbonate resin was obtained in the same manner as in Reference Example 1 except that 3.39 kg of BPC (manufactured by HONSHU CHEMICAL INDUSTRY CO., LTD.) and 30.47 kg of BPA (manufactured by Mitsubishi Chemical Corporation) were used instead of BPC as the material dihydroxy compounds. The viscosity average molecular weight of the obtained polycarbonate resin was 21,000.

(Reference Example 7): Preparation of PC(a7) (CDOBC/BPA (50/50 wt %) Copolymer, Melt Method)

The same operation as in Reference Example 1 was carried out except that 20.62 kg (about 90 mol) of BPA and 20.62 kg (about 54 mol) of 1,1-bis(4-hydroxy-3-methylphenyl)cyclododecane (hereinafter sometimes referred to as "CDOBC") (manufactured by Taoka Chemical Co., Ltd.) were used as the material dihydroxy compounds, and the aqueous solution of cesium carbonate was added so that cesium carbonate would be 1 μmol per 1 mol of the dihydroxy compounds to prepare a mixture. Of the obtained polycarbonate resin, the viscosity average molecular weight was 11,700, and the pencil hardness was 2H.

(Reference Example 2-1): Preparation of PC (a2-1) (BPC Homopolymer, Mv=33,000, Melt Method)

A polycarbonate resin was obtained in the same manner as in Reference Example 1 except that the polycondensation reaction was completed when the stirring machine of the second reactor achieved a predetermined stirring power (stirring power higher than in Reference Example 1). Of the obtained polycarbonate resin, the viscosity average molecular weight was 33,000, and the melt viscosity was 18,195 Poise.

(Reference Example 2-2): Preparation of PC(a2-2) (Bis-OCZ Homopolymer, Mv=2,100, Melt Method)

To 43.48 kg (about 147 mol) of bis-OCZ (manufactured by HONSHU CHEMICAL INDUSTRY CO., LTD.) as the material dihydroxy compound and 32.20 kg (about 150 mol) of diphenyl carbonate (DPC), an aqueous solution of cesium carbonate was added so that cesium carbonate would be 5 μmol per 1 mol of the dihydroxy compound to be prepare a mixture. The mixture was charged into a first reactor having an internal volume of 200 L equipped with a stirring machine, a heat medium jacket, a vacuum pump and a reflux condenser.

Then, an operation of reducing the pressure in the first reactor to 1.33 kPa (10 Torr) and recovering it to the atmospheric pressure with nitrogen was repeatedly carried out five times, and the interior of the first reactor was replaced with nitrogen. After replacement with nitrogen, a heat medium at a temperature of 230° C. was passed through the heat medium jacket to gradually increase the internal temperature of the first reactor thereby to dissolve the mixture. Then, the stirring machine was rotated at 300 rpm, and the temperature in the heat medium jacket was controlled to maintain the internal temperature of the first reactor at 220° C. Then, while phenol formed as a by-product by an oligomerization reaction of BPC and DPC carried out in the interior of the first reactor was distilled off, the pressure in the first reactor was reduced from 101.3 kPa (760 Torr) to 13.3 kPa (100 Torr) by the absolute pressure over a period of 40 minutes.

Then, the pressure in first reactor was maintained at 13.3 kPa, and while phenol was further distilled off, an ester exchange reaction was carried out for 80 minutes. Then, the polycarbonate resin was withdrawn from a valve at the bottom of the reactor. The viscosity average molecular weight of the obtained polycarbonate resin was 2,100.

(Reference Example 3-1): PC(a3-1)

100 parts by weight of Bis-OCZ as the material dihydroxy compound, 272.1 parts by weight of a 25 wt % sodium hydroxide (NaOH) aqueous solution and 411.3 parts by weight of water, in the presence of 0.339 part by weight of hydrosulfite, were dissolved at 60° C. and then cooled to room temperature to obtain a Bis-OCZ aqueous solution. This Bis-OCZ aqueous solution in a rate of 8.87 kg/hour and methylene chloride in a rate of 4.37 kg/hour were introduced into a 1.8 L glass first reactor equipped with a reflux condenser, a stirring machine and a coolant jacket, and brought into contact with phosgene at room temperature separately supplied thereto in a rate of 0.775 kg/hour. The reaction time at this time reached 38° C. Then, the reaction liquid/reaction gas mixture was introduced into a subsequent second reactor (1.8 L) having the same shape as the first reactor through an overflow tube attached to the reactor, and reacted. To the second reactor, separately, p-t-butylphenol (16 wt % methylene chloride solution) as a molecular weight adjusting agent was introduced at a rate of 0.037 kg/hour. Then, the reaction liquid/reaction gas mixture was introduced into an oligomerization tank (4.5 L) having the same shape as the first reactor through an overflow tube attached to the second reactor. To the oligomerization tank, separately, a 2 wt % trimethylamine aqueous solution as a catalyst was introduced at a rate of 0.016 kg/hour (0.00083 mol per 1 mol of Bis-OCZ). Then, the oligomerized emulsion thus obtained was further introduced into a separation tank (settler) having an internal volume of 5.4 L to separate an aqueous phase and an oil phase, thereby to obtain a methylene chloride solution of the oligomer.

2.44 kg of the above methylene chloride solution of the oligomer was charged into a reaction tank having an internal volume of 6.8 L equipped with a paddle blade, and 2.60 kg of methylene chloride for dilution was added, and further 0.245 kg of a 25 wt % sodium hydroxide aqueous solution, 0.953 kg of water and 8.39 g of a 2 wt % triethylamine aqueous solution were added, followed by stirring at 10° C. to carry out a polycondensation reaction for 180 minutes.

3.12 kg of the above polycondensation reaction liquid was charged into a reaction tank having an internal volume of 5.4 L equipped with a paddle blade, and 2.54 kg of methylene chloride and 0.575 kg of water were added, followed by stirring for 15 minutes, and then stirring was stopped to separate an aqueous phase and an organic phase. To the separated organic phase, 1.16 kg of 0.1 N hydrochloric acid was added, followed by stirring for 15 minutes, to extract triethylamine and an alkali component remaining in a small amount, and then stirring was stopped to separate an aqueous phase and an organic phase. Further, to the separated organic phase, 1.16 kg of pure water was added, followed by stirring for 15 minutes, and then stirring was stopped and an aqueous phase and an organic phase were separated. This operation was repeated three times. The obtained polycarbonate solution was fed into warm water of from 60 to 75° C., to powder the polycarbonate resin, followed by drying to obtain a powdery polycarbonate resin. Of the obtained polycarbonate resin, the viscosity average molecular weight was 49,900, and the melt viscosity was 127,200 poise.

(Reference Example 4-1): Preparation of PC(a-4-1): Preparation of BPC Homopolymer (Melt Method)

To 37.60 kg (about 147 mol) of 2,2-bis(4-hydroxy-3-methylphenyl)propane (hereinafter sometimes referred to as "BPC") (manufactured by HONSHU CHEMICAL INDUSTRY CO., LTD.) as the material dihydroxy carbonate and 32.20 kg (about 150 mol) of diphenyl carbonate (DPC), an aqueous solution of cesium carbonate was added so that cesium carbonate would be 2 μmol per 1 mol of the dihydroxy compound to prepare a mixture. Then, the mixture was charged into a first reactor having an internal capacity of 200 L equipped with a stirring machine, a heat medium jacket, a vacuum pump and a reflux condenser.

Then, an operation of reducing the pressure in the first reactor to 1.33 kPa (10 Torr) and then recovering it to the atmospheric pressure with nitrogen was repeatedly carried out five times, and the interior in the first reactor was replaced with nitrogen. After replacement with nitrogen, a heat medium at a temperature of 230° C. was passed through the heat medium jacket to gradually increase the internal temperature in the first reactor to dissolve the mixture. Then, the stirring machine was rotated at 300 rpm, and the temperature in the heat medium jacket was controlled to maintain the internal temperature of the first reactor at 220° C. Then, while phenol formed as a by-product by an oligomerization reaction of BPC and DPC carried out in the interior of the first reactor was distilled off, the pressure in the first reactor was reduced from 101.3 kPa (760 Torr) to 13.3 kPa (100 Torr) over a period of 40 minutes.

Then, the pressure in the first reactor was maintained at 13.3 kPa, and while phenol was further distilled off, an ester exchange reaction was carried out for 80 minutes.

Then, the pressure in the system was recovered to 101.3 kPa by the absolute pressure with nitrogen, and then the pressure was elevated to 0.2 mPa by the gauge pressure, and the oligomer in the first reactor was pumped to a second reactor by means of a transfer pipe preliminarily heated to at least 200° C. The second reactor had an internal volume of 200 L, was provided with a stirring machine, a heat medium jacket, a vacuum pump and a reflux condenser, and had the internal pressure and the internal temperature controlled to be the atmospheric pressure and 240° C.

Then, the oligomer pumped to the second reactor was stirred at 38 rpm, the internal temperature was raised by the heat medium jacket, and the pressure in the second reactor was reduced from 101.3 kPa to 13.3 kPa by the absolute pressure over a period of 40 minutes. Then, the temperature raising was continued, and the internal pressure was reduced from 13.3 kPa to 399 Pa (3 Torr) by the absolute pressure further over a period of 40 minutes, and the distilled phenol was removed out of the system. Further, the temperature raising was continued, and after the absolute pressure in the second reactor reached 70 Pa (about 0.5 Torr), a pressure of 70 Pa was maintained, and a polycondensation reaction was carried out. The final internal temperature in the second reactor was 285° C. When the stirring machine of the second reactor achieved a preliminarily determined stirring power, the polycondensation reaction was completed.

Then, the pressure in the second reactor was recovered to 101.3 kPa by the absolute pressure with nitrogen, and then the pressure was elevated to 0.2 mPa by the gauge pressure, and the polycarbonate resin was withdrawn from the bottom of the second reactor in the form of strands, which are pelletized by using a rotary cutter while cooling in a water tank. The viscosity average molecular weight of the obtained polycarbonate resin was 17,200.

The polycarbonate resin was evaluated in accordance with the above items.

The results are shown in Table 1.

(Reference Example 4-2): Preparation of PC (a-4-2) (BPC Homopolymer, Melt Method)

The same operation as in Reference Example 1 was carried out except that the preliminarily determined stirring power of the stirring machine of the second reactor was changed. The viscosity average molecular weight of the obtained polycarbonate resin was 30,300. Further, the polycarbonate resin was evaluated in the same manner as in Reference Example 1. The results are shown in Table 1.

(Reference Example 4-3): Preparation of PC(a-4-3) (BPC/BPA Copolymer, Melt Method)

A polycarbonate resin was obtained in the same manner as in Reference Example 5 except that the polycondensation reaction was completed when the stirring machine of the second reactor achieved a preliminarily determined stirring power (a stirring power higher than in Reference Example 5). The viscosity average molecular weight of the obtained polycarbonate resin was 25,200.

(Reference Example 4-4): Preparation of PC(a-4-4) (BPC/BPA Copolymer, Melt Method)

A polycarbonate resin was obtained in the same manner as in Reference Example 6 except that the polycondensation reaction was completed when the stirring machine of the second reactor achieved a preliminarily determined stirring power (a stirring power higher than in Reference Example 6). The viscosity average molecular weight of the obtained polycarbonate resin was 24,700.

(2) Polycarbonate Resin (b)

(Reference Example 8): PC(b1) (BPA Homopolymer, Melt Method)

As PC(b1), a commercially available polycarbonate resin (manufactured by Mitsubishi Engineering-Plastics Corporation, M7022J) comprising only structural units derived from BPA by the melt method was used. The viscosity average molecular weight of PC(b1) was 20,600. The melt viscosity was 9,010 poise.

(Reference Example 3-2): PC(b3-1) (BPA Homopolymer, Melt Method)

As PC(b3-1), a commercially available polycarbonate resin (manufactured by Mitsubishi Engineering-Plastics Corporation, M7027J) comprising only structural units derived from BPA by the melt method was used. The viscosity average molecular weight of PC(b2) was 25,600, and the melt viscosity was 22,120 poise.

(Reference Example 3-3): Preparation of PC(b3-2)

A polycarbonate resin was obtained in the same manner as in Reference Example 1 except that 3.4 kg of Bis-OCZ (manufactured by HONSHU CHEMICAL INDUSTRY CO., LTD.) and 30.9 kg of BPA (manufactured by Mitsubishi Chemical Corporation) were used instead of BPC as the material dihydroxy compounds. The viscosity average molecular weight of the obtained polycarbonate resin was 19,800.

(Reference Example 4-5): PC(b-4-1) (BPA Homopolymer, Melt Method)

As PC (b-4-1), a commercially available polycarbonate resin (manufactured by Mitsubishi Engineering-Plastics Corporation, M7022J) comprising only structural units derived from BPA by the melt method was used. The viscosity average molecular weight of PC(b-4-1) was 20,000. Further, evaluation was carried out in the same manner as in Reference Example 1. The results are shown in Table 4-1.

Example 1

As the polycarbonate resin (a) and the polycarbonate resin (b), PC(a1) and PC(b1) in a ratio as identified in Table 1 were melt-kneaded in a twin screw extruder (LABOTEX 30HSS-32) manufactured by Japan Steel Works, Ltd. having one vent port, extruded from the outlet of the twin screw extruder in the form of strands, solidified by cooling with water, and pelletized by a rotary cutter to obtain a polycarbonate resin composition. On that occasion, the barrel temperature of the twin screw extruder was 280° C., and the polycarbonate resin temperature at the outlet of the twin screw extruder was 300° C. At the time of melt-kneading, the vent port of the twin screw extruder was connected to a vacuum pump, and the pressure at the vent port was controlled to be 500 Pa.

The polycarbonate resin composition was subjected to evaluation with respect to the pencil hardness, the Charpy impact strength, the yellowness index (YI), the melt viscosity and the viscosity average molecular weight, in accordance with methods described in the above evaluation items. The results are shown in Table 1.

Further, the polycarbonate resin composition was molded into an extruded article (sheet) by the above method, which was subjected to evaluation with respect to the pencil hardness and the yellowness index (YI).

Examples 2 to 9

Polycarbonate resin compositions in Examples 2 to 9 were obtained in the same manner as in Example 1 except that two types of polycarbonate resins as identified in Table 1 were employed.

The polycarbonate resin compositions were subjected to evaluation with respect to the pencil hardness, the Charpy impact strength, the yellowness index (YI), the melt viscosity and the viscosity average molecular weight in accordance with methods as described in the above evaluation items. The results are shown in Table 1.

Further, the polycarbonate resin compositions in Examples 2 and 3 were molded into extruded articles (sheets) by the above method, which were subjected to evaluation with respect to the pencil hardness and the yellowness index (YI).

Example 10

Two types of polycarbonate resins as identified in Table 1 were dry-blended to obtain a polycarbonate resin composition.

The polycarbonate resin composition was evaluated with respect to the pencil hardness, the Charpy impact strength, the yellowness index (YI) and the viscosity average molecular weight in accordance with methods as described in the above evaluation items.

The results are shown in Table 1.

Comparative Examples 1 to 5

The pencil hardness, the Charpy impact strength, the yellowness index (YI), the melt viscosity and the viscosity average molecular weight of PC(a1) in Comparative Example 1, PC(b1) in Comparative Example 2, PC(a5) in Comparative Example 3, PC(a6) in Comparative Example 4 and PC(a3) in Comparative Example 5 by themselves were evaluated. The results are shown in Table 1.

Further, the polycarbonate resin compositions in Comparative Examples 1 to 4 were molded into extruded articles (sheets) by the above method, which were subjected to evaluation with respect to the pencil hardness and the yellowness index (YI).

Comparative Example 6

A polycarbonate resin composition in Comparative Example 6 was obtained in the same manner as in Example 1 except that two types of polycarbonate resins as identified in Table 1 were employed.

The polycarbonate resin composition was subjected to evaluation with respect to the pencil hardness, the Charpy impact strength, the yellowness index (YI), the melt viscosity and the viscosity average molecular weight in accordance with methods as described in the above evaluation items.

Further, the polycarbonate resin composition was molded into an extruded article (sheet) by the above method, which was subjected to evaluation with respect to the pencil hardness and the yellowness index (YI). The results are shown in Table 1.

Comparative Example 7

A polycarbonate resin composition in Comparative Example 7 was obtained in the same manner as in Example 1 except that PC(a1) and the BPC monomer as identified in Table 1 were employed.

The polycarbonate resin composition was subjected to evaluation with respect to the pencil hardness, the Charpy impact strength, the yellowness index (YI) and the melt viscosity in accordance with methods as described in the above evaluation items. The results are shown in Table 1.

TABLE 1

| | Polycarbonate resin (a) | | | | Polycarbonate resin (b) | | |
|---|---|---|---|---|---|---|---|
| | Type | Blending amount (wt %) | Hardness | Charpy impact strength (kJ/m$^2$) | Type | Blending amount (wt %) | Hardness |
| Ex. 1 | BPC homopolymer (melt method) | 30 | 2H | 6 | BPA homopolymer (melt method) | 70 | 2B |
| Ex. 2 | BPC homopolymer (melt method) | 20 | 2H | 6 | BPA homopolymer (melt method) | 80 | 2B |
| Ex. 3 | BPC homopolymer (melt method) | 10 | 2H | 6 | BPA homopolymer (melt method) | 90 | 2B |
| Ex. 4 | BPC homopolymer (interfacial method) | 20 | 2H | 5 | BPA homopolymer (melt method) | 80 | 2B |
| Ex. 5 | Bis-OCZ homopolymer (melt method) | 30 | 3H | 4 | BPA homopolymer (melt method) | 70 | 2B |
| Ex. 6 | Bis-OCZ homopolymer (melt method) | 20 | 3H | 4 | BPA homopolymer (melt method) | 80 | 2B |
| Ex. 7 | Bis-OCZ homopolymer (melt method) | 10 | 3H | 4 | BPA homopolymer (melt method) | 90 | 2B |
| Ex. 8 | BPC/BPA (50/50 wt %) copolymer | 20 | H | 7 | BPA homopolymer (melt method) | 80 | 2B |
| Ex. 9 | BPC homopolymer (melt method) | 20 | 2H | 6 | BPA homopolymer (melt method) | 80 | 2B |
| Ex. 10 | CDOBC/BPA (50/50 wt %) copolymer | 30 | H | 5 | BPA homopolymer (melt method) | 70 | 2B |
| Comp. Ex. 1 | BPC homopolymer (melt method) | 100 | 2H | — | — | — | — |
| Comp. Ex. 2 | — | — | — | — | BPA homopolymer (melt method) | 100 | 2B |
| Comp. Ex. 3 | BPC/BPA (30/70 wt %) copolymer | 100 | F | — | — | — | — |
| Comp. Ex. 4 | BPC/BPA (10/90 wt %) copolymer | 100 | B | — | — | — | — |
| Comp. Ex. 5 | Bis-OCZ homopolymer (melt method) | 100 | 3H | — | — | — | — |
| Comp. Ex. 6 | BPC homopolymer (melt method) | 50 | 2H | 6 | BPA homopolymer (melt method) | 50 | 2B |
| Comp. Ex. 7 | BPC monomer (*) | 0.1 | — | — | BPA homopolymer (melt method) | 99.9 | 2B |

| | Blend ratio (wt %) of dihydroxy compound | | | | Polycarbonate resin composition |
|---|---|---|---|---|---|
| | BPC | Bis-OCZ | CDOBC | BPA | production method |
| Ex. 1 | 30 | — | — | 70 | Melt-kneading |
| Ex. 2 | 20 | — | — | 80 | Melt-kneading |
| Ex. 3 | 10 | — | — | 90 | Melt-kneading |
| Ex. 4 | 20 | — | — | 80 | Melt-kneading |
| Ex. 5 | — | 30 | — | 70 | Melt-kneading |
| Ex. 6 | — | 20 | — | 80 | Melt-kneading |
| Ex. 7 | — | 10 | — | 90 | Melt-kneading |
| Ex. 8 | 10 | — | — | 90 | Melt-kneading |
| Ex. 9 | 20 | — | — | 80 | Dry-blending |
| Ex. 10 | — | — | 30 | 70 | Melt-kneading |

TABLE 1-continued

| | | | | | |
|---|---|---|---|---|---|
| Comp. Ex. 1 | 100 | — | — | — | — |
| Comp. Ex. 2 | — | — | — | 100 | — |
| Comp. Ex. 3 | 30 | — | — | 70 | — |
| Comp. Ex. 4 | 10 | — | — | 90 | — |
| Comp. Ex. 5 | — | 100 | — | — | — |
| Comp. Ex. 6 | 50 | — | — | 50 | Melt-kneading |
| Comp. Ex. 7 | 0.1 | — | — | 99.9 | Melt-kneading |

| | Polycarbonate resin composition | | | | | | Polycarbonate resin sheet | |
|---|---|---|---|---|---|---|---|---|
| | Pencil hardness | Comparison of pencil hardness with PC(b) | Charpy impact strength (kJ/m$^2$) | YI | Melt viscosity (poise) | Mv(a)/ Mv(b) | Pencil hardness | YI |
| Ex. 1 | H | Four ranks up (2B→H) | 8 | 2.8 | 5,980 | 0.90 | H | 0.87 |
| Ex. 2 | F | Three ranks up (2B→F) | 11 | 2.5 | 6,920 | 0.90 | H | 0.86 |
| Ex. 3 | F | Three ranks up (2B→F) | 14 | 2.3 | 7,850 | 0.90 | F | 0.86 |
| Ex. 4 | F | Three ranks up (2B→F) | 8 | 2.9 | 5,160 | 0.46 | — | — |
| Ex. 5 | H | Four ranks up (2B→H) | 8 | 2.0 | 5,140 | 0.50 | — | — |
| Ex. 6 | F | Three ranks up (2B→F) | 9 | 2.0 | 6,800 | 0.50 | — | — |
| Ex. 7 | HB | Two ranks up (2B→HB) | 12 | 1.9 | 7,930 | 0.50 | — | — |
| Ex. 8 | HB | Two ranks up (2B→HB) | 13 | 2.5 | — | 0.96 | — | — |
| Ex. 9 | F | Three ranks up (2B→F) | 10 | 2.3 | — | 0.90 | — | — |
| Ex. 10 | F | Three ranks up (2B→F) | 9 | 2.5 | — | 0.57 | — | — |
| Comp. Ex. 1 | 2H | — | 6 | 4.0 | 2,360 | — | 2H | 1.05 |
| Comp. Ex. 2 | 2B | — | 72 | 1.9 | 9,010 | — | B | 0.88 |
| Comp. Ex. 3 | F | — | 8 | 2.9 | — | — | F | 0.99 |
| Comp. Ex. 4 | B | — | 14 | 2.4 | — | — | HB | 0.95 |
| Comp. Ex. 5 | 3H | — | 4 | 3.6 | 1,640 | — | — | — |
| Comp. Ex. 6 | H | Four ranks up (2B→H) | 7 | 3.3 | 4,200 | 0.90 | 2H | 0.95 |
| Comp. Ex. 7 | 2B | — | 70 | 1.9 | 8,610 | — | — | — |

(*): As polycarbonate resin (a) in Comparative Example 7, a monomer was used, not a polycarbonate resin.

In Example 1 and Comparative Example 3, as the blend ratio of the dihydroxy compound is the same, the content of structural units derived from each dihydroxy compound is estimated to be the same. Nevertheless, Example 1 ranks higher in the pencil hardness as specified by ISO 15184 than Comparative Example 3. Further, with respect to the yellowness index (YI), Example 1 is superior to Comparative Example 3.

Likewise, in Example 3 and Comparative Example 4, in which the content of structural units derived from each dihydroxy compound is estimated to be the same, it is found that Example 3 is remarkably superior in the pencil hardness to Comparative Example 4. Further, by comparison between Example 1 and Comparative Example 6, it is found that if the weight ratio of the polycarbonate resin (a) to the polycarbonate resin (b) exceeds a specific range, the Charpy impact strength and the yellowness index (YI) are deteriorated.

Example 2-1

As the polycarbonate resin (a) and the polycarbonate resin (b), BPC homopolymer and PC(b1) in a ratio as identified in Table 2-1 were melt-kneaded in a twin screw extruder (LABOTEX 30HSS-32) manufactured by Japan Steel Works, Ltd. having one vent port, extruded from the outlet of the twin screw extruder in the form of strands, solidified by cooling with water, and pelletized by a rotary cutter to obtain a polycarbonate resin composition. On that occasion, the barrel temperature of the twin screw extruder was 280° C., and the polycarbonate resin temperature at the outlet of the twin screw extruder was 300° C. At the time of melt-kneading, the vent port of the twin screw extruder was connected to a vacuum pump, and the pressure at the vent port was controlled to be 500 Pa.

The polycarbonate resin composition was subjected to evaluation with respect to the pencil hardness, the melt viscosity, the Charpy impact strength and the yellowness index (YI), in accordance with methods described in the above evaluation items. Further, the pencil hardness and the yellowness index (YI) of the polycarbonate resin sheet were evaluated in accordance with methods as described in the above evaluation items. The results are shown in Table 2-1.

Examples 2-2 to 2-5, 2-7 and 2-8

Polycarbonate resin compositions in Examples 2-2 to 2-5, 2-7 and 2-8 were obtained in the same manner as in Example 2-1 except that two types of polycarbonate resins as identified in Table 2-1 were employed.

The polycarbonate resin composition was subjected to evaluation with respect to the pencil hardness, the melt viscosity, the Charpy impact strength and the yellowness index (YI) in accordance with methods as described in the above evaluation items. Further, in Example 2-2, the pencil hardness and the yellowness index (YI) of the polycarbonate resin sheet were evaluated in accordance with methods as described in the above evaluation items. The results are shown in Table 2-1.

Example 2-6

Two types of polycarbonate resins as identified in Table 2-1 were dry-blended to obtain a polycarbonate resin composition. The polycarbonate resin composition was subjected to evaluation with respect to the pencil hardness, the Charpy impact strength, the yellowness index (YI) and the viscosity average molecular weight in accordance with methods as described in the above evaluation items. The results are shown in Table 2-1.

Comparative Examples 2-1, 2-3 and 2-7

Polycarbonate resin compositions in Comparative Examples 2-1, 2-3 and 2-7 were obtained in the same manner as in Example 2-1 except that two types of polycarbonate resins as identified in Table 2-1 were employed.

The polycarbonate resin composition was subjected to evaluation with respect to the pencil hardness, the melt viscosity, the Charpy impact strength and the yellowness index (YI) in accordance with methods as described in the above evaluation items. Further, with respect to the polycarbonate resin compositions in Comparative Examples 2-1 and 2-7, the pencil hardness and the yellowness index (YI) of the polycarbonate resin sheet were evaluated in accordance with methods as described in the above evaluation items. The results are shown in Table 2-1.

Comparative Examples 2-2, 2-4, 2-5 and 2-6

The pencil hardness, the melt viscosity, the Charpy impact strength and the yellowness index (YI) of PC(a5) in Comparative Example 2-2, PC(a6) in Comparative Example 2-4, PC(a1) in Comparative Example 2-5 and PC(b1) in Comparative Example 2-6 by themselves were evaluated. Further, the pencil hardness and the yellowness index (YI) of the polycarbonate resin sheet were evaluated in accordance with methods as described in the above evaluation items. The results are shown in Table 2-1.

Comparative Example 2-8

A polycarbonate resin composition in Comparative Example 2-8 was obtained in the same manner as in Example 2-1 except that PC(b1) and the BPC monomer as identified in Table 2-1 were employed.

The polycarbonate resin composition was subjected to evaluation with respect to the pencil hardness, the melt viscosity, the Charpy impact strength and the yellowness index (YI) in accordance with methods as described in the above evaluation items. The results are shown in Table 2-1.

TABLE 2-1

| | Polycarbonate resin (a) | | | | Polycarbonate resin (b) | | |
|---|---|---|---|---|---|---|---|
| | Type | Blending amount (wt %) | Mv(a) | Pencil hardness | Type | Blending amount (wt %) | Mv(b) |
| Ex. 2-1 | BPC homopolymer (melt method) | 30 | 18,500 | 2H | BPA homopolymer (melt method) | 70 | 20,600 |
| Ex. 2-2 | BPC homopolymer (melt method) | 10 | 18,500 | 2H | BPA homopolymer (melt method) | 90 | 20,600 |
| Ex. 2-3 | Bis-OCZ homopolymer (melt method) | 30 | 10,200 | 3H | BPA homopolymer (melt method) | 70 | 20,600 |
| Ex. 2-4 | BPC/BPA (50/50 wt %) copolymer | 20 | 19,800 | H | BPA homopolymer (melt method) | 80 | 20,600 |
| Ex. 2-5 | BPC homopolymer (interfacial method) | 20 | 9,500 | 2H | BPA homopolymer (melt method) | 80 | 20,600 |
| Ex. 2-6 | BPC homopolymer (melt method) | 20 | 18,500 | 2H | BPA homopolymer (melt method) | 80 | 20,600 |
| Ex. 2-7 | Bis-OCZ homopolymer (melt method) | 20 | 2,100 | 3H | BPA homopolymer (melt method) | 80 | 20,600 |
| Ex. 2-8 | CDOBC/BPA (50/50 wt %) copolymer | 30 | H | 5 | BPA homopolymer (melt method) | 70 | 2B |
| Comp. Ex. 2-1 | BPC homopolymer (melt method) | 30 | 33,000 | 2H | BPA homopolymer (melt method) | 70 | 20,600 |
| Comp. Ex. 2-2 | BPC/BPA (30/70 wt %) copolymer | 100 | 20,300 | F | — | — | — |
| Comp. Ex. 2-3 | BPC homopolymer (melt method) | 10 | 33,000 | 2H | BPA homopolymer (melt method)- | 90 | 20,600 |
| Comp. Ex. 2-4 | BPC/BPA (10/90 wt %) copolymer | 100 | 21,000 | B | — | — | — |
| Comp. Ex. 2-5 | BPC homopolymer (melt method) | 100 | 18,500 | — | — | — | — |
| Comp. Ex. 2-6 | — | — | — | — | BPA homopolymer (melt method) | 100 | 20,600 |
| Comp. Ex. 2-7 | BPC homopolymer (melt method) | 50 | 18,500 | 2H | BPA homopolymer (melt method) | 50 | 20,600 |
| Comp. Ex. 2-8 | BPC monomer (*) | 0.1 | 256 | — | BPA homopolymer (melt method) | 99.9 | 20,600 |

| | Blend ratio (wt %) of dihydroxy compound | | | | Polycarbonate resin composition | | | Polycarbonate resin composition | | Polycarbonate resin sheet | |
|---|---|---|---|---|---|---|---|---|---|---|---|
| | BPC | Bis-OCZ | CDOBC | BPA | Polycarbonate resin composition production method | Mv(a)/Mv(b) | Pencil hardness | Charpy impact strength (kJ/m$^2$) | YI | Melt viscosity (poise) | Pencil hardness | YI |
| Ex. 2-1 | 30 | — | — | 70 | Melt-kneading | 0.90 | H | 8 | 2.8 | 5,980 | H | 0.87 |
| Ex. 2-2 | 10 | — | — | 90 | Melt-kneading | 0.90 | F | 14 | 2.3 | 7,850 | F | 0.86 |
| Ex. 2-3 | — | 30 | — | 70 | Melt-kneading | 0.50 | H | 8 | 2.0 | 5,140 | — | — |

TABLE 2-1-continued

| Example | | | | | | | | | | | | |
|---|---|---|---|---|---|---|---|---|---|---|---|---|
| Ex. 2-4 | 10 | — | — | 90 | Melt-kneading | 0.96 | HB | 13 | 2.5 | — | — | — |
| Ex. 2-5 | 20 | — | — | 80 | Melt-kneading | 0.46 | F | 8 | 2.9 | 5,160 | — | — |
| Ex. 2-6 | 20 | — | — | 80 | Dry-blending | 0.90 | F | 10 | 2.3 | — | — | — |
| Ex. 2-7 | 20 | — | — | 80 | Melt-kneading | 0.10 | F | 6 | 1.9 | 2,546 | — | — |
| Ex. 2-8 | — | — | 30 | 70 | Melt-kneading | 0.57 | F | 9 | 2.5 | — | — | — |
| Comp. Ex. 2-1 | 30 | — | — | 70 | Melt-kneading | 1.60 | F | 10 | 3.3 | 11,140 | F | 0.91 |
| Comp. Ex. 2-2 | 30 | — | — | 70 | — | — | F | 8 | 2.9 | — | F | 0.99 |
| Comp. Ex. 2-3 | 10 | — | — | 90 | Melt-kneading | 1.60 | HB | 12 | 2.8 | 9,420 | | |
| Comp. Ex. 2-4 | 10 | — | — | 90 | — | — | B | 14 | 2.4 | — | HB | 0.95 |
| Comp. Ex. 2-5 | 100 | — | — | — | — | — | 2H | 6 | 4.0 | 2,360 | 2H | 1.05 |
| Comp. Ex. 2-6 | — | — | — | 100 | — | — | 2B | 72 | 1.9 | 9,010 | B | 0.88 |
| Comp. Ex. 2-7 | 50 | — | — | 50 | Melt-kneading | 0.90 | H | 7 | 3.3 | 4,200 | 2H | 0.95 |
| Comp. Ex. 2-8 | 0.1 | — | — | 99.9 | Melt-kneading | 0.01 | 2B | 70 | 1.9 | 8,610 | — | — |

(*): As polycarbonate resin (a) in Comparative Example 8, a monomer was used, not a polycarbonate resin.

In Example 2-1 and Comparative Example 2-2, as the blend ratio of the dihydroxy compound is the same, the content of structural units derived from each dihydroxy compound is estimated to be the same. Nevertheless, Example 2-1 ranks higher in the pencil hardness as specified by ISO 15184 than Comparative Example 2-2. Further, with respect to the yellowness index (YI), it is found that Example 2-1 is superior to Comparative Example 2-2.

Likewise, in Example 2-2 and Comparative Example 2-4, in which the content of structural units derived from each dihydroxy compound is estimated to be the same, it is found that Example 2-2 is remarkably superior in the pencil hardness to Comparative Example 2-4. Further, by comparison between Example 2-1 and Comparative Example 2-1, and between Example 2-2 and Comparative Example 2-3, it is found that if the ratio of the viscosity average molecular weight of the polycarbonate resin (a) to the viscosity average molecular weight of the polycarbonate resin (b) does not satisfy a specific range, the pencil hardness is decreased, and the yellowness index (YI) is remarkably deteriorated. Further, by comparison among Example 2-1, Example 2-2 and Comparative Example 2-7, it is found that if the weight ratio of the polycarbonate resin (a) to the polycarbonate resin (b) exceeds a specific range, the Charpy impact strength and the yellowness index (YI) are remarkably deteriorated.

Example 3-1

As the polycarbonate resin (a) and the polycarbonate resin (b), PC(a1) and PC(b1) in a ratio as identified in Table 1 were melt-kneaded in a twin screw extruder (LABOTEX 30HSS-32) manufactured by Japan Steel Works, Ltd. having one vent port, extruded from the outlet of the twin screw extruder in the form of strands, solidified by cooling with water, and pelletized by a rotary cutter to obtain a polycarbonate resin composition. On that occasion, the barrel temperature of the twin screw extruder was 280° C., and the polycarbonate resin temperature at the outlet of the twin screw extruder was 300° C. At the time of melt-kneading, the vent port of the twin screw extruder was connected to a vacuum pump, and the pressure at the vent port was controlled to be 500 Pa.

The polycarbonate resin composition was subjected to evaluation with respect to the surface hardness, the glass transition temperature (Tg), the Charpy impact strength and the yellowness index (YI), in accordance with methods as described in the above evaluation items. The results are shown in Table 3-1.

Further, the polycarbonate resin composition was molded into an extruded article (sheet) by the above method, which was subjected to evaluation with respect to the pencil hardness and the yellowness index (YI). The results are shown in Table 3-1.

Examples 3-2 to 3-4 and 3-6

Polycarbonate resin compositions in Examples 3-2 to 3-4 and 3-6 were obtained in the same manner as in Example 3-1 except that two types of polycarbonate resins as identified in Table 3-1 were employed.

The polycarbonate resin composition was subjected to evaluation with respect to the surface hardness, the glass transition temperature (Tg), the Charpy impact strength and the yellowness index (YI) in accordance with methods as described in the above evaluation items. The results are shown in Table 3-1.

Further, the polycarbonate resin composition in Example 3-3 was molded into an extruded article (sheet) by the above method, which was subjected to evaluation with respect to the pencil hardness and the yellowness index (YI). The results are shown in Table 3-1.

Example 3-5

As the polycarbonate resin (a) and the polycarbonate resin (b), pellets of PC(a1) and pellets of PC(b1) in a ratio as identified in Table 3-1 were dry-blended to obtain a polycarbonate resin composition in Example 3-5.

The polycarbonate resin composition was subjected to evaluation with respect to the surface hardness, the glass transition temperature (Tg), the Charpy impact strength and the yellowness index (YI) in accordance with methods as described in the above evaluation items. The results are shown in Table 3-1.

Further, the polycarbonate resin composition was molded into an extruded article (sheet) by the above method, which was subjected to evaluation with respect to the pencil hardness and the yellowness index (YI). The results are shown in Table 3-1.

Comparative Examples 3-1 to 3-4

Polycarbonate resin compositions in Comparative Examples 3-1 to 3-4 were obtained in the same manner as in Example 3-1 except that two types of polycarbonate resins as identified in Table 3-1 were employed.

The polycarbonate resin composition was subjected to evaluation with respect to the surface hardness, the glass transition temperature (Tg), the Charpy impact strength and the yellowness index (YI) in accordance with methods as described in the above evaluation items. The results are shown in Table 3-1.

Further, the polycarbonate resin composition in Comparative Example 3-1 was molded into an extruded article (sheet) by the above method, which was subjected to evaluation with respect to the pencil hardness and the yellowness index (YI). The results are shown in Table 3-1.

Comparative Examples 3-5 to 3-8

The surface hardness, the glass transition temperature (Tg), the Charpy impact strength and the yellowness index (YI) of PC(b1) in Comparative Example 3-5, PC(a1) in Comparative Example 3-6, PC(a6) in Comparative Example 3-7 and PC(b3-2) in Comparative Example 3-8 by themselves were evaluated, and the results are shown in Table 3-1.

Further, each of the polycarbonate resin compositions in Comparative Examples 3-5 to 3-7 was molded into an extruded article (sheet) by the above method, which was subjected to evaluation with respect to the pencil hardness and the yellowness index (YI). The results are shown in Table 3-1.

TABLE 3-1

| | | Polycarbonate resin (a) | | | | | |
|---|---|---|---|---|---|---|---|
| | | Type | | Glass transition temperature (° C.) | Blending amount (wt %) | Mv | Melt viscosity | Pencil hardness |
| Ex. 3-1 | PC(a1) | BPC homopolymer (melt method) | 119 | 10 | 18,500 | 2,361 | 2H |
| Ex. 3-2 | PC(a3) | Bis-OCZ homopolymer (melt method) | 132 | 10 | 10,200 | 1,641 | 3H |
| Ex. 3-3 | PC(a1) | BPC homopolymer (melt method) | 119 | 20 | 18,500 | 2,361 | 2H |
| Ex. 3-4 | PC(a2-1) | BPC homopolymer (melt method) | 122 | 20 | 33,000 | 18,195 | 2H |
| Ex. 3-5 | PC(a1) | BPC homopolymer (melt method) | 119 | 20 | 18,500 | 2,361 | 2H |
| Ex. 3-6 | PC(a7) | CDOBC/BPA (50/50 wt %) copolymer | 161 | 30 | 11,700 | — | 2H |
| Comp. Ex. 3-1 | PC(a1) | BPC homopolymer (melt method) | 119 | 50 | 18,500 | 2,361 | 2H |
| Comp. Ex. 3-2 | PC(a2-1) | BPC homopolymer (melt method) | 122 | 20 | 33,000 | 18,195 | 2H |
| Comp. Ex. 3-3 | PC(a3) | Bis-OCZ homopolymer (melt method) | 132 | 50 | 10,200 | 1,641 | 3H |
| Comp. Ex. 3-4 | PC(a3-2) | Bis-OCZ homopolymer (interfacial method) | 138 | 20 | 49,900 | 127,200 | 3H |
| Comp. Ex. 3-5 | — | — | — | — | — | — | — |
| Comp. Ex. 3-6 | PC(a1) | BPC homopolymer (melt method) | 119 | 20 | 18,500 | 2,361 | 2H |
| Comp. Ex. 3-7 | — | — | — | — | — | — | — |
| Comp. Ex. 3-8 | — | — | — | — | — | — | — |

| | | Polycarbonate resin (b) | | | | | |
|---|---|---|---|---|---|---|---|
| | | Type | | Glass transition temperature (° C.) | Blending amount (wt %) | Mv | Melt viscosity | Pencil hardness |
| Ex. 3-1 | PC(b1) | BPA homopolymer (melt method) | 145 | 90 | 20,600 | 9,010 | 2B |
| Ex. 3-2 | PC(b1) | BPA homopolymer (melt method) | 145 | 90 | 20,600 | 9,010 | 2B |
| Ex. 3-3 | PC(b3-1) | BPA homopolymer (melt method) | 147 | 80 | 25,600 | 22,120 | 2B |
| Ex. 3-4 | PC(b3-1) | BPA homopolymer (melt method) | 147 | 80 | 25,600 | 22,120 | 2B |
| Ex. 3-5 | PC(b1) | BPA homopolymer (melt method) | 145 | 80 | 20,600 | 22,120 | 2B |
| Ex. 3-6 | PC(b1) | BPA homopolymer (melt method) | 145 | 80 | 20,600 | 22,120 | 2B |
| Comp. Ex. 3-1 | PC(b1) | BPA homopolymer (melt method) | 145 | 80 | 20,600 | 9,010 | 2B |
| Comp. Ex. 3-2 | PC(b1) | BPA homopolymer (melt method) | 145 | 80 | 20,600 | — | 2B |
| Comp. Ex. 3-3 | PC(b1) | BPA homopolymer (melt method) | 145 | 50 | 20,600 | 9,010 | 2B |
| Comp. Ex. 3-4 | PC(b1) | BPA homopolymer (melt method) | 145 | 50 | 20,600 | 9,010 | 2B |
| Comp. Ex. 3-5 | PC(b1) | BPA homopolymer (melt method) | 145 | 100 | 20,600 | 9,010 | 2B |
| Comp. Ex. 3-6 | — | — | — | — | — | — | — |
| Comp. Ex. 3-7 | PC(a6) | BPA/BPC copolymer (melt method) | 140 | 100 | 21,000 | — | B |
| Comp. Ex. 3-8 | PC(b3-2) | BPA/Bis-OCZ copolymer (melt method) | 143 | 100 | 19,800 | — | B |

TABLE 3-1-continued

| | Monomer unit (wt %) | | | Pencil hardness on the surface of molded article | Polycarbonate resin composition | | | | Polycarbonate sheet | | |
|---|---|---|---|---|---|---|---|---|---|---|---|
| | BPC | Bis-OCZ | CDOBC | BPA | | Tg (°C.) | Charpy impact strength (kJ/m$^2$) | YI (—) | Comparison of pencil hardness with PC(b) | Pencil hardness | Thickness (μm) | YI |
| Ex. 3-1 | 10 | — | — | 90 | F | 142 | 14 | 2.3 | Three ranks up (2B→F) | F | 240 | 0.86 |
| Ex. 3-2 | — | 10 | — | 90 | HB | 144 | 12 | 1.9 | Two ranks up (2B→HB) | — | — | — |
| Ex. 3-3 | 20 | — | — | 80 | F | 142 | 12 | 2.5 | Three ranks up (2B→F) | F | 240 | 0.86 |
| Ex. 3-4 | 20 | — | — | 80 | F | 143 | 14 | 2.7 | Three ranks up (2B→F) | — | — | — |
| Ex. 3-5 | 20 | — | — | 80 | F | — | 11 | 2.3 | Three ranks up (2B→F) | H | 240 | 0.86 |
| Ex. 3-6 | — | — | 15 | 85 | F | 149 | 9 | 2.5 | Three ranks up (2B→F) | — | — | — |
| Com-p. Ex.3-1 | 50 | — | — | 50 | H | 131 | 7 | 3.3 | Four ranks up (2B→H) | 2H | 240 | 0.95 |
| Co-mp. Ex. 3-2 | 20 | — | — | 80 | F | 140 | 11 | 3.0 | Three ranks up (2B→F) | — | — | — |
| Comp. Ex. 3-3 | — | 50 | — | 50 | 2H | 137 | 5 | 1.9 | Five ranks up (2B→2H) | — | — | — |
| Comp. Ex. 3-4 | — | 20 | — | 80 | F | 146 | 11 | 3.8 | Three ranks up (2B→F) | — | — | — |
| Comp. Ex. 3-5 | — | — | — | 100 | 2B | 145 | 72 | 1.9 | — | B | 240 | 0.88 |
| Comp. Ex. 3-6 | 100 | — | — | | 2H | 119 | 6 | 4.0 | — | 2H | 240 | 1.05 |
| Comp. Ex. 3-7 | 10 | — | — | 90 | B | 140 | 14 | 2.4 | — | HB | 240 | 0.95 |
| Comp. Ex. 3-8 | — | 10 | — | 90 | B | 143 | 12 | 2.3 | — | — | — | — |

In Example 3-1 and Comparative Example 3-7, as the blend ratio of the dihydroxy compound is the same, the content of structural units derived from each dihydroxy compound is estimated to be the same. Nevertheless, it is found that Example 3-1 ranks higher in the pencil hardness as specified by ISO 15184 by two ranks than Comparative Example 3-7. Further, with respect to the yellowness index (YI), Example 3-1 is superior to Comparative Example 3-7. Likewise, with respect to Example 3-2 and Comparative Example 3-8, in which the content of structural units derived from each dihydroxy compound is estimated to be the same, Example 3-2 is remarkably superior in the pencil hardness to Comparative Example 3-8. Further, by comparison between Example 3-1 and Comparative Example 3-1 and between Example 3-2 and Comparative Example 3-3, it is found that if the weight ratio of the polycarbonate resin (a) to the polycarbonate resin (b) exceeds a specific range, the glass transition temperature (Tg), the Charpy impact strength and the yellowness index (YI) are remarkably deteriorated. Further, by comparison between Example 3-3 and Comparative Example 3-2 and between Example 3-4 and Comparative Example 3-4, it is found that if the melt viscosity of the polycarbonate resin (a) and the melt viscosity of the polycarbonate resin (b) do not satisfy a specific range, the Charpy impact strength is decreased, and the yellowness index (YI) is remarkably deteriorated.

TABLE 4-1

| | Abbreviated name | Blend ratio (wt %) of dihydroxy compound | Mv | Intrinsic viscosity [η] | Pencil hardness |
|---|---|---|---|---|---|
| Reference Ex. 4-1 | BPC homopolymer (a4-1) | BPC (100) | 17,200 | 0.4 | 2H |
| Reference Ex. 1 | BPC homopolymer (a1) | BPC (100) | 18,500 | 0.43 | 2H |
| Reference Ex. 4-2 | BPC homopolymer (a4-2) | BPC (100) | 30,300 | 0.69 | 2H |
| Reference Ex. 3 | BisOC-Z homopolymer (a3) | BisOC-Z (100) | 10,200 | 0.23 | 3H |
| Reference Ex. 4-3 | BPC/BPA copolymer (a4-3) | BPC/BPA (30/70) | 25,200 | 0.55 | F |
| Reference Ex. 4-4 | BPC/BPA copolymer (a4-4) | BPC/BPA (10/90) | 24,700 | 0.55 | B |
| Reference Ex. 4-1 | BPA homopolymer (b4-1) | BPA (100) | 20,000 | 0.46 | 2B |
| Reference Ex. 8 | BPA homopolymer (b1) | BPA (100) | 20,600 | 0.47 | 2B |
| Reference Ex. 3-2 | BPA homopolymer (b3-1) | BPA (100) | 25,600 | 0.56 | 2B |

Example 4-1

As the polycarbonate resin (a) and the polycarbonate resin (b), PC(a-4-1) and PC(b-4-1) in a ratio as identified in Table 4-2 were melt-kneaded in a twin screw extruder (LABOTEX 30HSS-32) manufactured by Japan Steel Works, Ltd. having one vent port, extruded from the outlet of the twin screw extruder in the form of strands, solidified by cooling with water, and pelletized by a rotary cutter to obtain a molded article of polycarbonate resin. On that occasion, the barrel temperature of the twin screw extruder was 280° C., and the polycarbonate resin temperature at the outlet of the twin screw extruder was 300° C. At the time of melt-kneading, the vent port of the twin screw extruder was connected to a vacuum pump, and the pressure at the vent port was controlled to be 500 Pa.

The molded article of polycarbonate resin was subjected to evaluation with respect to the surface hardness, the Charpy impact strength, the yellowness index (YI), the content of structural units (a) on the surface of the molded article of polycarbonate resin and the content of structural units (a) in the entire molded article of polycarbonate resin in accordance with methods as described in the above evaluation items.

The results are shown in Table 4-2. In Example 4-1, the structural units (a) are structural units derived from BPC.

Examples 4-2 to 4-4

Molded articles of polycarbonate resin in Examples 4-2 to 4-4 were obtained in the same manner as in Example 4-1 except that two types of polycarbonate resins as identified in Table 4-2 were employed. Further, they were subjected to evaluation in the same manner as in Example 4-1. The results are shown in Table 4-2. In Examples 4-2 and 4-3, the structural units (a) are structural units derived from BPC, and in Example 4-4, the structural units (a) are structural units derived from Bis-OCZ.

Comparative Examples 4-1 to 4-4

Molded articles of polycarbonate resin in Comparative Examples 4-1 to 4-4 were obtained in the same manner as in Example 4-1 except that two types of polycarbonate resins as identified in Table 4-2 were employed. Further, they were subjected to evaluation in the same manner as in Example 4-1. The results are shown in Table 4-2. In Comparative Examples 4-1 and 4-4, the structural units (a) are structural units derived from BPC.

Comparative Examples 4-5 to 4-8

As identified in Table 4-2, as the polycarbonate resin, PC(a1) in Comparative Example 4-5, PC(b1) in Comparative Example 4-6, PC(a-4-3) in Comparative Example 4-7 and PC(a-4-4) in Comparative Example 4-8 were used by themselves to obtain molded articles of polycarbonate resin in Comparative Examples 4-5 to 4-8. Further, they were subjected to evaluation in the same manner as in Example 4-1. The results are shown in Table 4-2. In Comparative Examples 4-5, 4-7 and 4-8, the structural units (a) are structural units derived from BPC, and in Comparative Example 4-6, the structural units (a) are structural units derived from BPA.

TABLE 4-2

| | Polycarbonate resin (a) | | Polycarbonate resin (b) | |
|---|---|---|---|---|
| | Type | Blending amount wt % | Type | Blending amount wt % |
| Ex. 4-1 | BPC homopolymer (a4-1) | 20 | BPA homopolymer (b4-1) | 80 |
| Ex. 4-2 | BPC homopolymer (a1) | 10 | BPA homopolymer (b1) | 90 |
| Ex. 4-3 | BPC homopolymer (a1) | 10 | BPA homopolymer (b3-1) | 90 |
| Ex. 4-4 | BisOC-Z homopolymer (a3) | 20 | BPA homopolymer (b1) | 10 |
| Comp. Ex. 4-1 | BPC homopolymer (a1) | 50 | BPA homopolymer (b1) | 50 |
| Comp. Ex. 4-2 | BPC homopolymer (a4-2) | 20 | BPA homopolymer (b4-1) | 80 |
| Comp. Ex. 4-3 | BPC homopolymer (a4-2) | 10 | BPA homopolymer (b1) | 90 |
| Comp. Ex. 4-4 | BPC homopolymer (a4-2) | 10 | BPA homopolymer (b3-1) | 80 |
| Comp. Ex. 4-5 | BPC homopolymer (a1) | 100 | — | — |
| Comp. Ex. 4-6 | — | — | BPA homopolymer (b1) | 100 |
| Comp. Ex. 4-7 | BPA/BPC copolymer (a4-3) | 70/30 | — | — |
| Comp. Ex. 4-8 | BPA/BPC copolymer (a4-4) | 90/10 | — | — |

| | | Molded article of polycarbonate resin | | | | |
|---|---|---|---|---|---|---|
| | Structural units (a) | Content of structural units (a) on the surface of molded article wt % | Content of structural units (a) in the entire molded article wt % | Structural units (a) content ratio between surface layer/the entire [S]/[T] | Pencil hardness on the surface of molded article | Charpy impact strength kJ/m² |
| Ex. 4-1 | BPC | 23 | 20 | 1.15 | F | 11 |
| Ex. 4-2 | BPC | 11 | 10 | 1.1 | F | 14 |
| Ex. 4-3 | BPC | 10.5 | 10 | 1.05 | HB | 17 |
| Ex. 4-4 | BisOC-Z | 22 | 20 | 1.1 | F | 9 |

TABLE 4-2-continued

| | | | | | | |
|---|---|---|---|---|---|---|
| Comp. Ex. 4-1 | BPC | 49 | 50 | 0.98 | H | 7 |
| Comp. Ex. 4-2 | BPC | 20 | 20 | 1.0 | HB | 11 |
| Comp. Ex. 4-3 | BPC | 10 | 10 | 1.0 | HB | 14 |
| Comp. Ex. 4-4 | BPC | 10 | 10 | 1.0 | B | 10 |
| Comp. Ex. 4-5 | BPC | 100 | 100 | 1.0 | 2H | 6 |
| Comp. Ex. 4-6 | — | 100 | 100 | 1.0 | 2B | 72 |
| Comp. Ex. 4-7 | BPC | 30 | 30 | 1.0 | F | 8 |
| Comp. Ex. 4-8 | BPC | 10 | 10 | 1.0 | B | 14 |

By comparison between Example 4-1 and Comparative Example 4-2, although the content of structural units (a) (structural units derived from BPC) in the entire molded article of polycarbonate resin is the same, in Example 4-1, the content of the structural units (a) on the surface of the molded article of polycarbonate resin is high, and the pencil hardness as specified by ISO 15184 in Example 4-1 is higher than the pencil hardness in Comparative Example 4-2.

Likewise, by comparison among Example 4-2, Comparative Example 4-3 and Comparative Example 4-8, although the content of structural units (a) (structural units derived from BPC) in the entire molded article of polycarbonate resin is the same, in Example 4-2, the content of the structural units (a) (structural units derived from BPC) on the surface of the molded article of polycarbonate resin is high, and the pencil hardness as specified by ISO 15184 is high, as compared with Comparative Examples 4-3 and 4-8.

INDUSTRIAL APPLICABILITY

According to the present invention, it is possible to obtain a polycarbonate resin composition and a molded article, which have a remarkably improved surface hardness of the polycarbonate resin composition comprising a relatively low general purpose aromatic polycarbonate resin as the main component, and which have high transparency, favorable color, and well-balanced impact strength and moldability, and the present invention is applicable particularly to applications for which the surface hardness is required, such as electric/electronic equipment fields such as cellular phones and personal computers, automobile fields such as headlamp lenses and windows for vehicles, and building material fields such as illumination and exterior.

This application is a continuation of PCT Application No. PCT/JP2011/058326, filed on Mar. 31, 2011, which is based upon and claims the benefit of priority from Japanese Patent Application No. 2010-083181 filed on Mar. 31, 2010, Japanese Patent Application No. 2010-262053 filed on Nov. 25, 2010, Japanese Patent Application No. 2010-262054 filed on Nov. 25, 2010, Japanese Patent Application No. 2010-262057 filed on Nov. 25, 2010, Japanese Patent Application No. 2011-018523 filed on Jan. 31, 2011, Japanese Patent Application No. 2011-018524 filed on Jan. 31, 2011, Japanese Patent Application No. 2011-018527 filed on Jan. 31, 2011, Japanese Patent Application No. 2011-047877 filed on Mar. 4, 2011 and Japanese Patent Application No. 2011-076450 filed on Mar. 30, 2011. The contents of those applications are incorporated herein by reference in their entireties.

What is claimed is:

1. A polycarbonate resin composition comprising at least a polycarbonate resin (a) and a polycarbonate resin (b) having structural units different from the polycarbonate resin (a), wherein the polycarbonate resin (b) has bis-phenol A structural units, which satisfies the following requirements:
   (i) the pencil hardness of the polycarbonate resin (a) as specified by ISO 15184 is higher than the pencil hardness of the polycarbonate resin (b) as specified by ISO 15184;
   (ii) the weight ratio of the polycarbonate resin (a) to the polycarbonate resin (b) is from 10:90 to 30:70;
   (iii) the pencil hardness of the polycarbonate resin composition as specified by ISO 15184 is higher by at least two ranks than the pencil hardness of the polycarbonate resin (b) as specified by ISO 15184;
   (iv) the Charpy impact strength of the polycarbonate resin composition is higher than the Charpy impact strength of the polycarbonate resin (a), and
   (v) the Charpy impact strength of the polycarbonate resin composition is at least 8 kJ/m$^2$, wherein the Charpy impact strength is measured according to JIS K7111 on a molded specimen having a notch of 0.25 mmR,
   wherein the polycarbonate resin (a) is a polycarbonate resin having structural units derived from a compound represented by the following formula (1a):

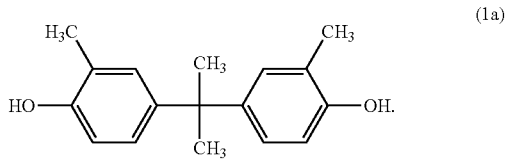

2. A polycarbonate resin composition comprising at least a polycarbonate resin (a) and a polycarbonate resin (b) having structural units different from the polycarbonate resin (a), wherein the polycarbonate resin (b) has bis-phenol A structural units, which satisfies the following requirements:
   (i) the pencil hardness of the polycarbonate resin (a) as specified by ISO 15184 is higher than the pencil hardness of the polycarbonate resin (b) as specified by ISO 15184;
   (ii) the weight ratio of the polycarbonate resin (a) to the polycarbonate resin (b) is from 10:90 to 30:70;
   (iii) the ratio of the viscosity average molecular weight Mv(a) of the polycarbonate resin (a) to the viscosity average molecular weight Mv(b) of the polycarbonate resin (b), Mv(a)/Mv(b), is at least 0.02 and at most 1.5, and (iv) the Charpy impact strength of the polycarbonate resin composition is at least 8 kJ/m², wherein the Charpy impact strength is measured according to JIS K7111 on a molded specimen having a notch of 0.25 mmR, wherein the polycarbonate resin (a) is a polycarbonate resin having structural units derived from a compound represented by the following formula (1a):

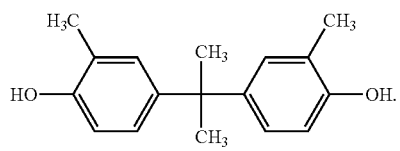

3. The polycarbonate resin composition according to claim 2, wherein the above Mv(a) is at most 20,000.

4. A polycarbonate resin composition comprising at least a polycarbonate resin (a) and a polycarbonate resin (b) having structural units different from the polycarbonate resin (a), wherein the polycarbonate resin (b) has bis-phenol A structural units, which satisfies the following requirements:
(i) the pencil hardness of the polycarbonate resin (a) as specified by ISO 15184 is higher than the pencil hardness of the polycarbonate resin (b) as specified by ISO 15184;
(ii) wherein the weight ratio of the polycarbonate resin (a) to the polycarbonate resin (b) is from 10:90 to 30:70;
(iii) the melt viscosity of the polycarbonate resin (b) at a temperature of 280° C. at a shear rate of 122 sec⁻¹ is higher than the melt viscosity of the polycarbonate resin (a) at a temperature of 280° C. at a shear rate of 122 sec⁻¹, and
(iv) the Charpy impact strength of the polycarbonate resin composition is at least 8 kJ/m², wherein the Charpy impact strength is measured according to JIS K7111 on a molded specimen having a notch of 0.25 mmR, wherein the polycarbonate resin (a) is a polycarbonate resin having structural units derived from a compound represented by the following formula (1a):

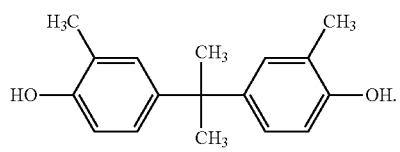

5. The polycarbonate resin composition according to claim 1, wherein the pencil hardness of the polycarbonate resin (a) as specified by ISO 15184 is at least F.

6. The polycarbonate resin composition according to claim 1, wherein the pencil hardness of the polycarbonate resin composition as specified by ISO 15184 is at least HB.

7. The polycarbonate resin composition according to claim 1, which has a yellowness index (YI) of at most 4.0.

8. The polycarbonate resin composition according to claim 1, which further contains a flame retardant.

9. A method for producing the polycarbonate resin composition as defined in claim 1, which comprises melt-kneading the polycarbonate resin (a) and the polycarbonate resin (b).

10. A method for producing the polycarbonate resin composition as defined in claim 1, which comprises dry-blending the polycarbonate resin (a) and the polycarbonate resin (b).

11. An injection-molded article, which is obtained by injection-molding the polycarbonate resin composition as defined in claim 1.

12. An extruded article, which is obtained by extruding the polycarbonate resin composition as defined in claim 1.

13. The extruded article according to claim 12, which is a sheet or a film.

14. A molded article of polycarbonate resin having structural units (a) derived from a compound represented by the following formula (1a) and structural units (b) different from the structural units (a), wherein the structural units (b) are bis-phenol A units and wherein the weight ratio of the structural units (a) to the structural units (b) is from 10:90 to 30:70 based on the total weight of the structural units (a) and the structural units (b), wherein the ratio of the content [S] of the structural units (a) on the surface of the molded article of polycarbonate resin to the content [T] in the entire molded article of polycarbonate resin ([S]/[T]) is higher than 1.00 and at most 2.00:

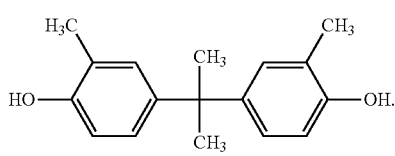

15. The molded article of polycarbonate resin according to claim 14, which is an injection-molded article.

16. The molded article of polycarbonate resin according to claim 14, wherein the ratio of the content [S] of the structural units (a) on the surface of the molded article of polycarbonate resin to the content [T] in the entire molded article of polycarbonate resin ([S]/[T]) is at least 1.01 and at most 1.50.

17. The molded article of polycarbonate resin according to claim 14, wherein the pencil hardness on the surface of the molded article of polycarbonate resin as specified by ISO 15184 is at least HB.

18. The molded article of polycarbonate resin according to claim 14, which comprises at least a polycarbonate resin (a) having structural units (a) derived from the compound represented by the formula (1a) and the polycarbonate resin (b) having bis-phenol A structural units.

19. The molded article of polycarbonate resin according to claim 18, wherein the pencil hardness of the polycarbonate resin (a) as specified by ISO 15184 is higher than the pencil hardness of the polycarbonate resin (b) as specified by ISO 15184.

20. The molded article of polycarbonate resin according to claim 18, wherein the pencil hardness of the polycarbonate resin (a) as specified by ISO 15184 is at least F.

21. The molded article of polycarbonate resin according to claim 18, wherein the viscosity average molecular weight of the polycarbonate resin (a) is higher than the viscosity average molecular weight of the polycarbonate resin (b).

22. A method for producing the molded article of polycarbonate resin as defined in claim 18, which comprises
melt-kneading or dry-blending the polycarbonate resin (a) and the polycarbonate resin (b), followed by molding, wherein the viscosity average molecular weight of the polycarbonate resin (a) is higher than the viscosity average molecular weight of the polycarbonate resin (b).

23. The method for producing the molded article of polycarbonate resin according to claim 22, wherein the molding is injection molding.

24. The polycarbonate resin composition of claim 1, wherein at least 50 wt % based on 100 wt % of all the structural units in the polycarbonate resin (a) are of formula (1a)
wherein the polycarbonate resin (b) is a polycarbonate resin having mainly bis-phenol A structural units (b).

25. The polycarbonate resin composition of claim 2, wherein at least 50 wt % based on 100 wt % of all the structural units in the polycarbonate resin (a) are of formula (1a), and
wherein the polycarbonate resin (b) is a polycarbonate resin having mainly bis-pehnol A structural units (b).

26. The polycarbonate resin composition of claim 4, wherein at least 50 wt % based on 100 wt % of all the structural units in the polycarbonate resin (a) are of formula (1a)
wherein the polycarbonate resin (b) is a polycarbonate resin having mainly bis-pehnol A structural units (b).

27. The polycarbonate resin composition of claim 1, wherein the polycarbonate resin (a) is a homopolymer of structural units derived from the compound of formula (1a).

28. The polycarbonate resin composition of claim 2, wherein the polycarbonate resin (a) is a homopolymer of structural units derived from the compound of formula (1a).

29. The polycarbonate resin composition of claim 4, wherein the polycarbonate resin (a) is a homopolymer of structural units derived from the compound of formula (1a).

30. The molded article of polycarbonate resin claim 18, wherein the polycarbonate resin (a) is a homopolymer of structural units derived from the compound of formula (1a).

31. The polycarbonate resin composition according to claim 1, having a Charpy impact strength of at least 10 $kJ/m^2$.

32. The polycarbonate resin composition according to claim 2, having a Charpy impact strength of at least 10 $kJ/m^2$.

33. The polycarbonate resin composition according to claim 4, having a Charpy impact strength of at least 10 $kJ/m^2$.

* * * * *